United States Patent [19]
Kaga et al.

[11] Patent Number: 5,609,781
[45] Date of Patent: Mar. 11, 1997

[54] MACHINING HEAD AND LASER MACHINING APPARATUS

[75] Inventors: Kunihiko Kaga; Satoru Kotoh, both of Amagasaki; Shuji Ogawa, Nagoya; Masaru Kanaoka, Nagoya; Toru Murai, Nagoya, all of Japan

[73] Assignee: Mitsubishi Denki Kabushiki Kaisha, Tokyo, Japan

[21] Appl. No.: 326,265

[22] Filed: Oct. 20, 1994

Related U.S. Application Data

[63] Continuation-in-part of Ser. No. 139,888, Oct. 22, 1993.

[30] Foreign Application Priority Data

Oct. 23, 1992 [JP] Japan ..................... 4-285801
Oct. 21, 1993 [JP] Japan ..................... 5-263608

[51] Int. Cl.⁶ ................................... B23K 26/14
[52] U.S. Cl. ................. 219/121.84; 219/121.67; 219/121.83
[58] Field of Search ............... 219/121.6, 121.63, 219/121.67, 121.72, 121.83, 121.84

[56] References Cited

U.S. PATENT DOCUMENTS

| | | | |
|---|---|---|---|
| 5,149,937 | 9/1992 | Babel et al. | 219/121.68 |
| 5,220,149 | 6/1993 | Neidhardt | 219/121.84 |

FOREIGN PATENT DOCUMENTS

| | | | |
|---|---|---|---|
| 3637568 | 5/1988 | Germany | 219/121.84 |
| 57-209792 | 12/1982 | Japan | 219/121.84 |
| 61-123495 | 6/1986 | Japan | . |
| 61-60757 | 12/1986 | Japan | . |
| 63-56389 | 3/1988 | Japan | . |
| 63-76785 | 4/1988 | Japan | . |
| 1-181991 | 7/1989 | Japan | . |
| 2-263585 | 10/1990 | Japan | 219/121.6 |
| 90/00458 | 1/1990 | WIPO | 219/121.84 |

*Primary Examiner*—Teresa J. Walberg
*Assistant Examiner*—Gregory L. Mills
*Attorney, Agent, or Firm*—Burns, Doane, Swecker & Mathis, LLP

[57] ABSTRACT

A machining head of a laser machining apparatus for adjusting flow speed distribution includes a sub assist gas supply inlet; an annular partition for partitioning the inside of the sub assist gas nozzle toward axis direction; an annular flat board which contacts rotatably to the side surface of the down stream of the annular partition wall, and interrupts a part of gas supply inlet, and a part of which is notched; two partition plates which are mounted on both end portions of the annular flat board, partition the inside of the sub assist gas nozzle down stream of the annular partition wall, and rotate with the annular flat board; a driving device for driving the annular flat board; and a control apparatus for operating the driving device.

15 Claims, 28 Drawing Sheets

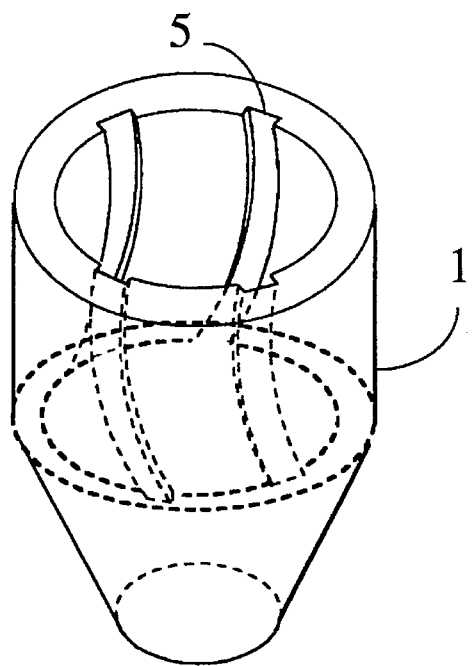
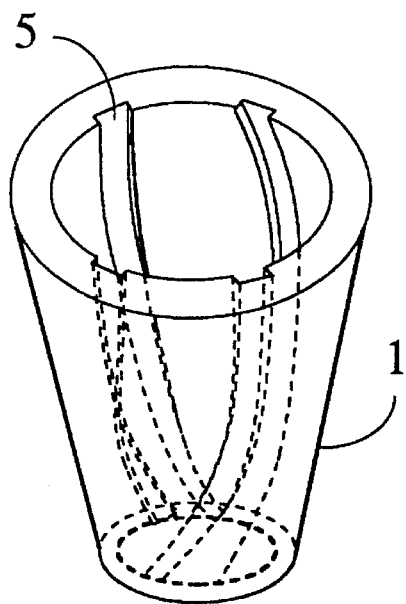
FIG. 11A　　　　FIG. 11B
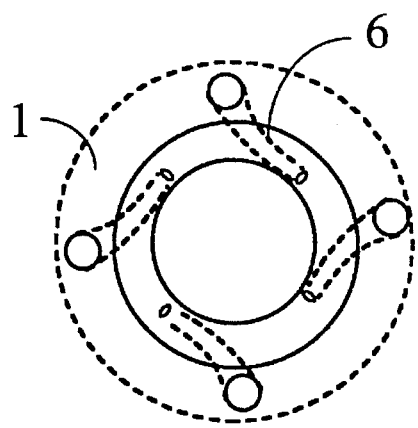
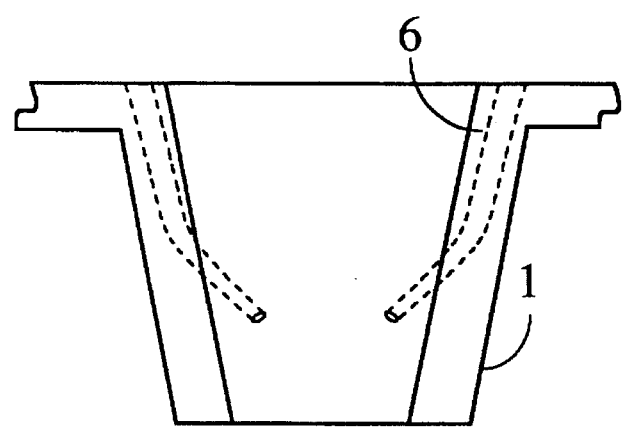
FIG. 12A　　　　FIG. 12B

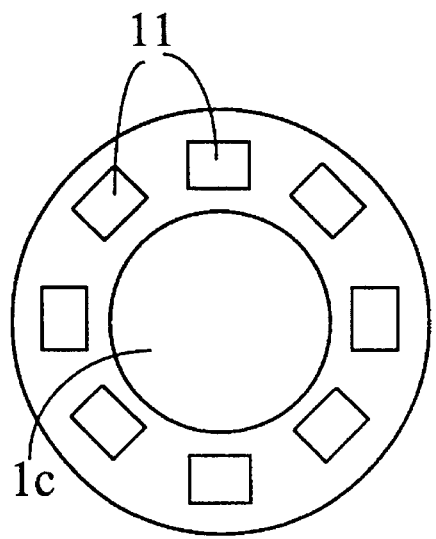
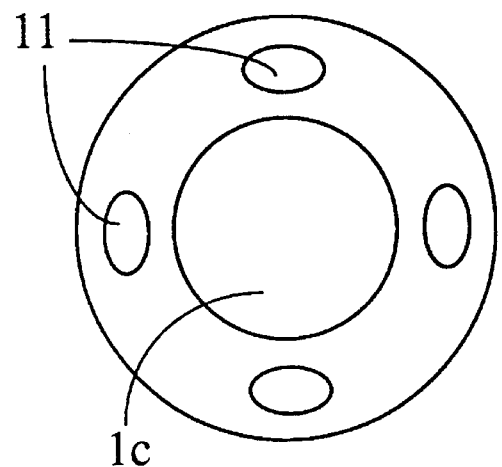
FIG. 25A         FIG. 25B
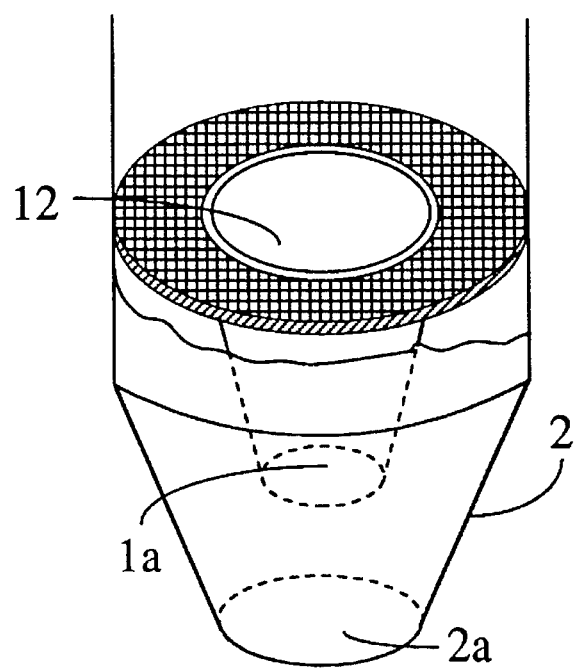
FIG. 26 ns 5,609,781

MACHINING HEAD AND LASER MACHINING APPARATUS

This application is a continuation-in-part of application Ser. No. 08/139,888, filed Oct. 22, 1993.

BACKGROUND OF THE INVENTION

1. Field of the Invention

The invention relates to a laser machining head for cutting work and a laser machining apparatus for controlling the laser machining head.

2. Description of the Prior Art

The cutting performance of a laser machining apparatus is affected by operating conditions such as the location of the focal point of the laser beam against the work surface, the assist gas pressure and the distance between the work surface and the leading edge of the laser beam nozzle. It also depends on conditions such as the kinds of material, surface condition, quality, composition, and thickness of the work. Regarding the laser machining apparatus, it is expected to work under a wide range of conditions and for a wide range of materials as described above and to obtain a stable machining quality. Especially, in case of cutting steel and so on, the metal which is melted by direct laser beam heating is not only blown off by an oxygen jet flow used as an assist gas, but is also sublimated or melted with a strong oxidized burning reaction, which improves cutting efficiency. Therefore, the cross-sectional quality of the work surface very much depends upon oxidized burning speed on it.

Namely, the higher the velocity of oxidized burning, the less the roughness on the cross-sectional surface. Since supplied oxygen is consumed continuously, self-burning (the phenomenon where strong self-burning happens explosively in the absent of a laser beam so that cross-sectional quality is damaged) due to excessive oxygen seldom happens. Also, since the cutting speed is increased, high speed cutting can be conducted. Therefore, it is very important to optimize the gas supply condition and to increase oxidized burning speed. Based on the above situations, many kinds of improvement on gas supply nozzle have been attained.

FIG. 46 is a longitudinal sectional view of a laser beam nozzle which is installed in the machining head of a conventional laser machining apparatus. The laser beam nozzle is disclosed, for example, in Japanese patent publication No. 61-60757. In the figure, the numeral 1 denotes a main assist gas nozzle, the numeral 2 denotes a sub assist gas nozzle, the numeral 3 denotes a surface of the material being cut, and the numeral 10 denotes an assist gas source.

The operation of laser beam machining apparatus is explained hereafter. The laser beam nozzle installed in a conventional laser beam machining apparatus is constructed as mentioned above. The nozzle has a multiple structure which comprises a gas flow path on the center axis and concentric multiple gas flow paths arranged around the center gas flow path. The oxygen supplied to the material being cut from the gas flow path on center axis, has comparatively high pressure and is discharged at a high speed. The oxygen is supplied mainly into the cutting groove and used partially for the oxidized burning reaction. The remaining oxygen is used to blow off and eliminate the melted and oxidized material. The oxygen supplied from the outside flow path flows at a comparatively low speed. The air, flowing from the outside, stabilizes the gas flow near the center axis and keeps the oxygen concentration at a high level. Moreover, the direction of jet flow from the outlet of the sub assist gas is arranged parallel to the outlet of the main assist gas and keeps the assist gas in a laminar flow. Since there are thick walls at the border of outlets of the main assist gas and the outlet of each sub assist gas, and also since the interference between the main assist gas and the sub assist gas is suppressed, main assist gas is kept in the laminar flow condition accordingly.

In the laser machining, it is necessary to supply continuously a required amount of assist gas (oxygen gas) into the narrow cutting groove whose width is less than 1.0 mm during cutting the work, although the oxidized burning reaction occurs due to the assist gas (oxygen gas) supplied to the cutting surface of the metal which is heated to a high temperature by the energy of the laser beam. Combustion products (gas or melted metal) are produced near the cutting surface due to the oxidized reaction. If the jet flow of the assist gas (oxygen gas) is in a laminar flow condition, the assist gas must reach the metal surface by dispersing through the ambient combustion product (gas composition). It is effective accordingly to make a jet flow of assist gas turbulent, to disturb the boundary layer in the combustion reaction area near the cutting surface and to replace the combustion product (gas composition) with fresh assist gas in order to increase the speed of combustion.

The laser beam nozzle installed in machining head of a conventional laser machining apparatus is arranged so that the jet direction of the sub assist gas outlet is parallel to that of the main assist gas outlet, and discharges the sub assist gas in a laminar flow, so that the interference with the main assist gas is greatly suppressed. Therefore, the main assist gas is kept in a laminar flow and stabilized. Although the purity of the assist gas (oxygen purity) is kept at a high level, since the gas flow at the center portion is stabilized, it is necessary to increase supply pressure of the main assist gas so as to effectively supply the assist gas (oxygen gas) into the narrow cutting groove. Since a boundary layer of low assist concentration (oxygen concentration) is formed on the oxidized reaction surface of the metal due to small velocity fluctuation (strength of turbulence) of the center portion of the nozzle flow, it is difficult for fresh assist gas (oxygen gas) to reach reaction surface directly. Therefore, there is a problem that the supplied assist gas (oxygen gas) does not contribute effectively to the oxidized reaction. Also, them is another problem that the self burning may occur when the oxygen which is not used effectively may remain at the narrow cutting groove due to some condition of the flow quantity. Since a thick wall exists at the boundary of the jet outlets of the main assist gas and each sub assist gas, the assist gas jet pressure or the jet velocity distribution from the front edge of the laser beam nozzle does not vary continuously.

Accordingly, the jet flows of the main assist gas, each sub assist gas and the surrounding air are separated at the thick wall of their respective boundary. Therefore, there is a further another problem that the main assist gas purity (oxygen purity) decreases, since diffusion mixing improves between the main assist gas and the sub assist gas, and the isolation effect is decreased between the outermost sub assist gas and the surrounding air.

SUMMARY OF THE INVENTION

It is a primary object of the present invention to provide a machining head in a laser machining apparatus, which may decrease roughness of the cutting surface, may attain to suppression of the self burning, may supply assist gas (oxygen gas) having small flowing quantity of ambient air, high purity and large turbulence to the work surface, may promote an oxidized reaction, and may machine the work stably, at high speed and with high quality, and also may machine the work stably and precisely using a machining head.

According to one aspect of the present invention, there is provided a machining head of a laser machining apparatus in which the laser beam passes through, the machining head comprises a main assist gas nozzle at a center portion of the machining head for supplying a main assist gas; and at least one annular sub assist gas nozzle surrounding the main assist gas nozzle, a jet outlet at an innermost diameter of the annular sub assist gas nozzle being no smaller than a jet outlet of the main assist gas nozzle, gas pressure and gas flow speed at the jet outlet being continuously changing, and pressure fluctuation and flow fluctuation value of the main assist gas flow being increased; and means for adjusting flow speed distribution at the sub assist gas nozzle outlet.

According to another aspect of the present invention, there is provided a machining head wherein the means for adjusting flow speed distribution is comprised of a plurality of small rooms partitioned toward radius direction by the partition walls.

According to another aspect of the present invention, there is provided a machining head wherein the means for adjusting flow speed distribution comprises a plurality of gas supply inlets which correspond to the plurality of small rooms, respectively.

According to another aspect of the present invention, there is provided a machining head wherein the means for adjusting flow speed distribution comprises: a sub assist gas supply inlet; an annular partition for partitioning the inside of the sub assist gas nozzle toward axis direction; an annular flat board which contacts rotatably to the side surface of the down stream of the annular partition wall, and interrupts a part of gas supply inlet, and a part of which is notched; two partition plates which is mounted on both end portions of the annular flat board, partitions the inside of the sub assist gas nozzle down stream of the annular partition wall, and rotates with the annular flat board; a driving device for driving said annular flat board; and a control apparatus for operating the driving device.

According to another aspect of the present invention, there is provided a laser machining apparatus including the machining heads, comprising: information sensors for detecting a temperature of machining surface, width of cutting groove, or amount of spark; and an operation control apparatus for adjusting kinds of gases, flow quantity and pressure of the assist gas which is supplied from the machining head in response to the signals from the information sensor.

According to further aspect of the present invention, there is provided a laser machining apparatus including the machining head, wherein the operation control apparatus is controlled by the program.

According to still another aspect of the present invention, there is provided a laser machining apparatus including the machining head, further comprising: means for measuring the thickness of the work; an operation control apparatus for adjusting, flow quantity and pressure of the assist gas which is supplied from the machining head in response to an output of the thickness measuring means.

BRIEF DESCRIPTION OF THE DRAWINGS

FIGS. 11A, 11B illustrate main assist gas nozzles of a machining head of a fourth embodiment.

FIGS. 12A, 12B illustrate main assist gas nozzles of a machining head of a fifth embodiment.

FIGS. 25A and 25B are plan views which illustrate other examples of small hole shapes for assist gas supply inlet of the embodiment 10.

FIG. 26 is a partial perspective view which illustrates a machining head of an eleventh embodiment.

DETAILED DESCRIPTION OF THE PREFERRED EMBODIMENTS

Embodiment 1

Figure 1:
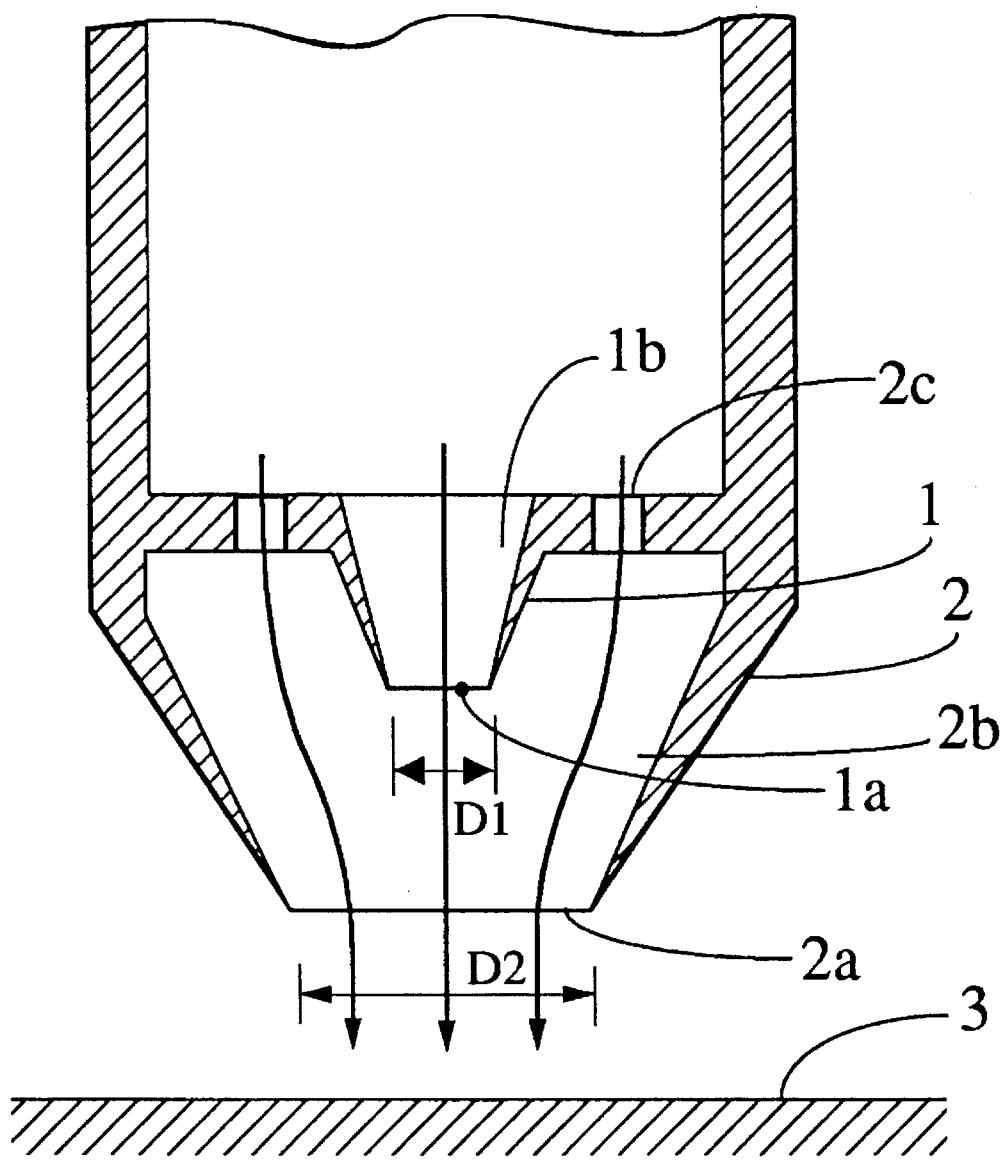
FIG. 1 is a longitudinal cross-sectional view which illustrates a machining head of a laser machining apparatus which corresponds to a first embodiment.

FIG. 1 is a longitudinal sectional view which illustrates a machining head of a laser machining apparatus corresponding to the first embodiment of the present invention. The machining head comprises a main assist gas jet nozzle outlet $1a$ having a diameter of $D_1$ which is located at an innermost position and a main assist gas nozzle duct $1b$ which is adjacent to the main assist gas jet nozzle outlet $1a$. The main assist gas nozzle 1 is where the laser beam passes through, inside a sub assist gas nozzle jet outlet 2. The sub assist gas nozzle jet outlet 2 comprises a sub assist gas nozzle $2a$ having a diameter of $D_2$ ($D_2 \geq D_1 : D_2 > D_1$ in this case) which is located outside of the main assist gas nozzle 1 and a duct $2b$ adjacent to the sub assist gas nozzle $2a$ form a multiple part construction (in this case, two part construction). The jet outlet $1a$ of the main assist gas nozzle 1 is located upstream of the jet outlet $2a$ of sub assist gas nozzle 2. This construction causes jet gas pressure and the jet gas flow velocity to vary continuously at the jet outlet, and allows both the pressure fluctuation and the flow velocity fluctuation of the main assist gas flow to be large. The assist gas (oxygen gas) is supplied on the cutting work surface 3 through the path as indicated by the arrows in the figure.

Figure 2:
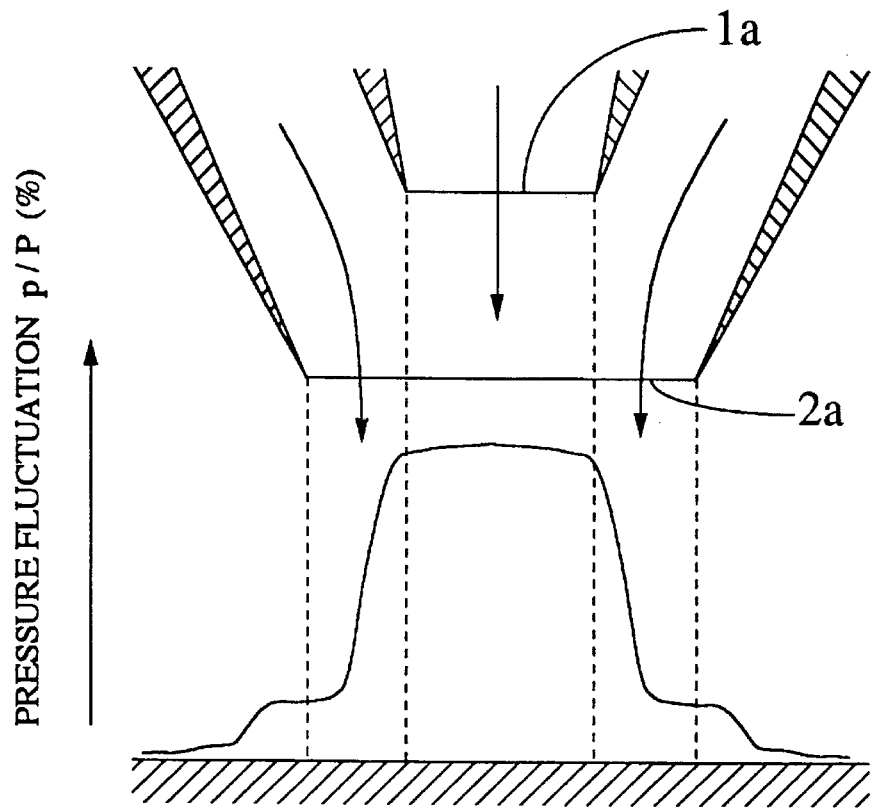
FIG. 2 illustrates a pressure fluctuation distribution of assist gas flow on the cutting work surface of the embodiment 1.

FIG. 2 illustrates a pressure fluctuation distribution of assist gas flow on the cutting work surface 3. The vertical scale shows pressure fluctuation p/P(%) (p: pressure fluctuation, P: absolute pressure). The curve corresponds to the location of the jet outlet of assist gas. Since the flow velocity fluctuation of assist gas which flows through the main assist gas nozzle is large, the pressure fluctuation of main assist gas just below the jet outlet $1a$ is large, alternately the pressure fluctuation of sub assist gas just below jet outlet $2a$ is controlled to be low. The desired amount of gas flow is supplied to the cutting groove without increasing original pressure by the pumping effect of the pressure fluctuation.

The large fluctuation of flow velocity means that the turbulence of oxygen gas flow supplied into the cutting groove is large and the gas flow is in the state of turbulent flow. Near the cutting surface of the work, an oxide produced by the reaction and oxygen form a mixed layer, and the oxidized reaction speed depends upon the velocity at which oxygen reaches the reaction surface by dispersing through inside said mixed layer. It is accordingly effective to cause the gas flow to be in the state of turbulent flow and to cause the mixed layer to be unstable for increasing the rate of the oxidized reaction.

Therefore, a machining head having a nozzle construction such as described above causes the oxygen gas flow to be in the state of turbulent flow. The machining head of the present embodiment causes the mixed layer to be unstable as explained in FIG. 3. Therefore, it is possible to supply the oxygen gas directly near the reaction surface and to remove simultaneously the mixed gas having high oxide concentration out of the reaction area. Accordingly, the oxidized burning rate is increased remarkably due to an increased amount of oxygen supplied, and high speed cutting becomes possible. Since the supplied oxygen gas is effectively consumed continuously, the self-burning caused by the temperature rise due to laser and the imbalance of the oxidized reaction rate can be prevented and stable machining can be carried out.

Since the flow of ambient air is prevented by the assist gas (oxygen gas) which flows from the assist gas nozzle jet, the purity of oxygen at center flow (namely, the main assist gas) which flows into the cutting groove is maintained and stable cutting can be achieved.

Figure 3:
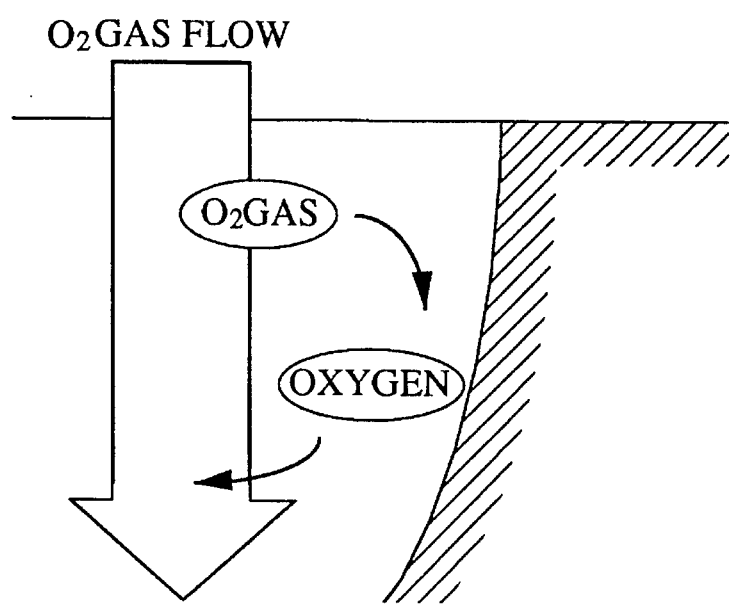
FIG. 3 illustrates the principle for improving the cutting characteristic of the first embodiment.
Figure 4:
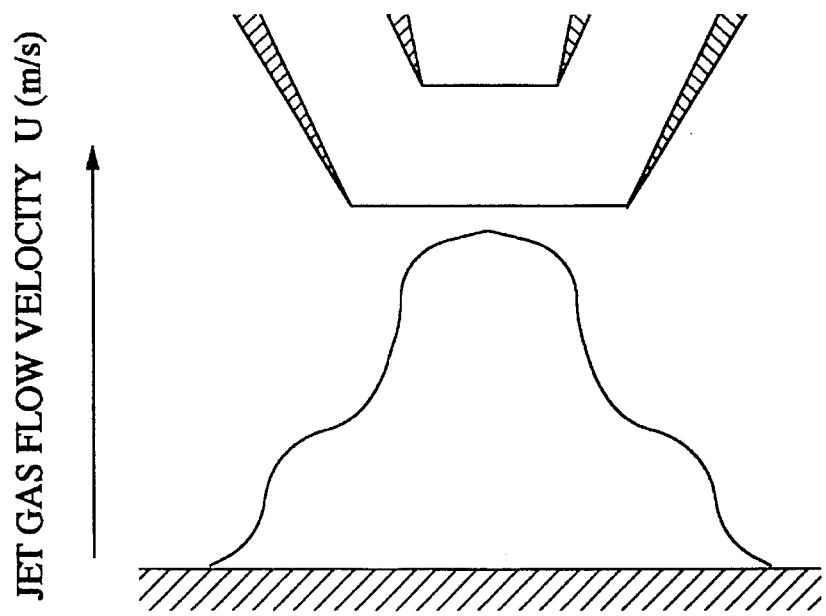
FIG. 4 illustrates a flow velocity distribution on the cutting work surface in an arrangement according to the first embodiment.

FIG. 4 illustrates a flow velocity distribution on the cutting work surface of the first embodiment. The vertical scale indicates jet gas flow velocity U (m/s) corresponding to the assist gas jet outlet. According to the present embodiment, since the jet gas pressure and jet gas velocity distribution at the assist gas jet outlet are higher near the center portion than the outer portion and continuously varied as indicated in FIG. 3 and FIG. 4, no separation occurs between the main assist gas flow and the sub assist gas flow and at the border with the surrounding air. Accordingly, the problem can be overcome that the purity of the oxygen gas (oxygen purity) decreases due to the decrease of the air cut off effect of sub assist gas.

Figure 5:
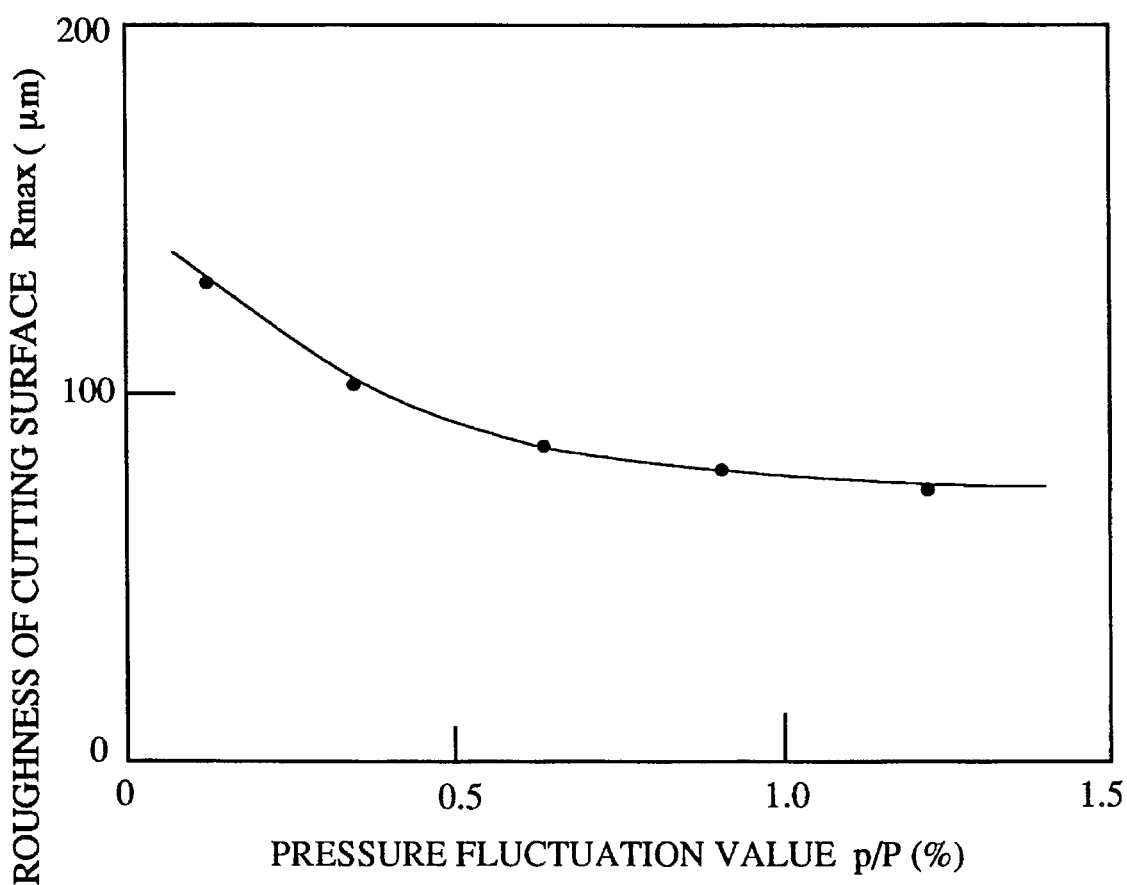
FIG. 5 illustrates the relationship between the pressure fluctuation value of assist gas flow and the roughness of the cutting surface in the present invention.

FIG. 5 illustrates relationship between the roughness of the cutting surface versus the pressure fluctuation value of the assist gas flow of the present invention. The horizontal scale shows the pressure fluctuation value (%) which is the pressure ratio of the pressure fluctuation component p against the pressure P of the main assist gas (p/P) on the work surface just under the center axis. The vertical scale indicates the cutting surface roughness Rmax (μm). The cutting material is mild steel SS400 having a thickness of 12 mm. The machining condition is defined such that the laser power is 1400 W, and the machining velocity is 0.7 m/min. It is clearly understood from FIG. 5 that the larger the pressure fluctuation value is, the less the cutting surface roughness is. Namely, FIG. 5 indicates that high speed cutting in good quality can be achieved by machining using a machining head having a nozzle construction of the embodiment of the present invention.

Figure 6A:
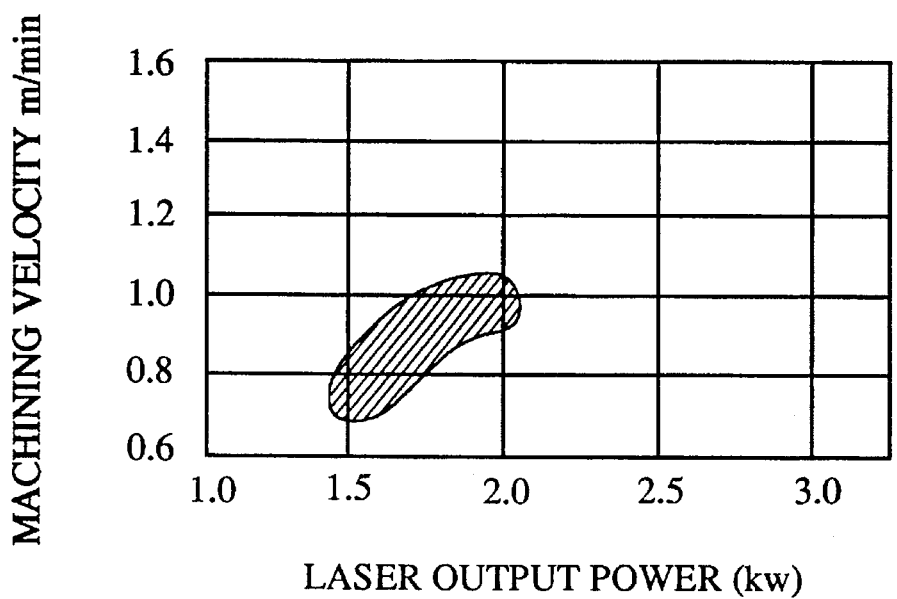
FIGS. 6A and 6B illustrate a comparison between the machining velocity and tolerance for laser output power of the first embodiment and the conventional example.
Figure 6B:
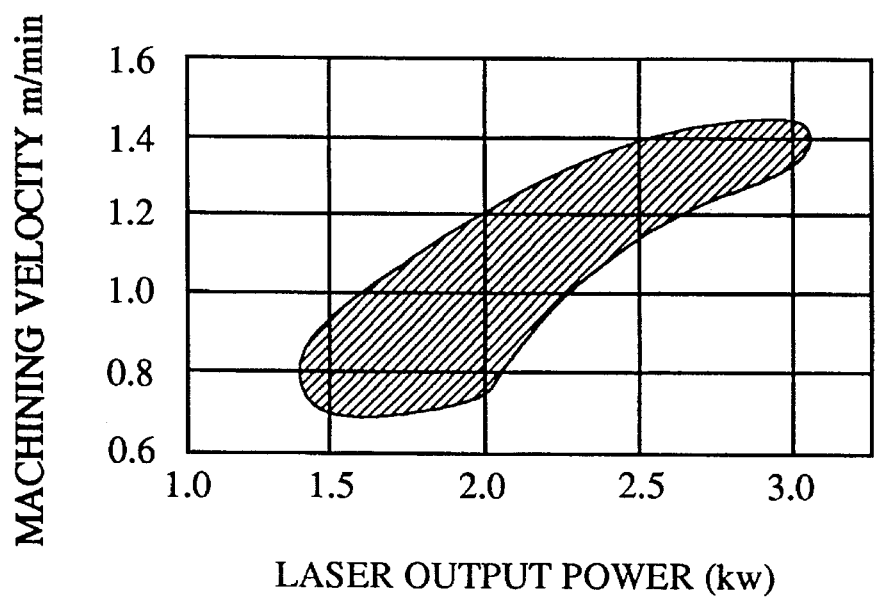

FIGS. 6A and 6B illustrate tolerances of the machining velocity against the laser output power during a laser cutting test using the machining head of the present embodiment and the conventional machining head. The vertical scale shows machining velocity (m/min), the horizontal scale shows laser output power (kw). The material used is SS400, having a thickness of 12 mm. FIG. 6A indicates the tolerance of the conventional type machining head (pressure fluctuation value is 0.1(%) and FIG. 6B indicates that of the machining head of the present embodiment. The areas covered with slanted lines in FIGS. 6A, 6B are areas for normal machining for cutting. As seen from the figures, it is understood easily that high-speed cutting may be achieved using the machining head of the present embodiment.

Figure 7:
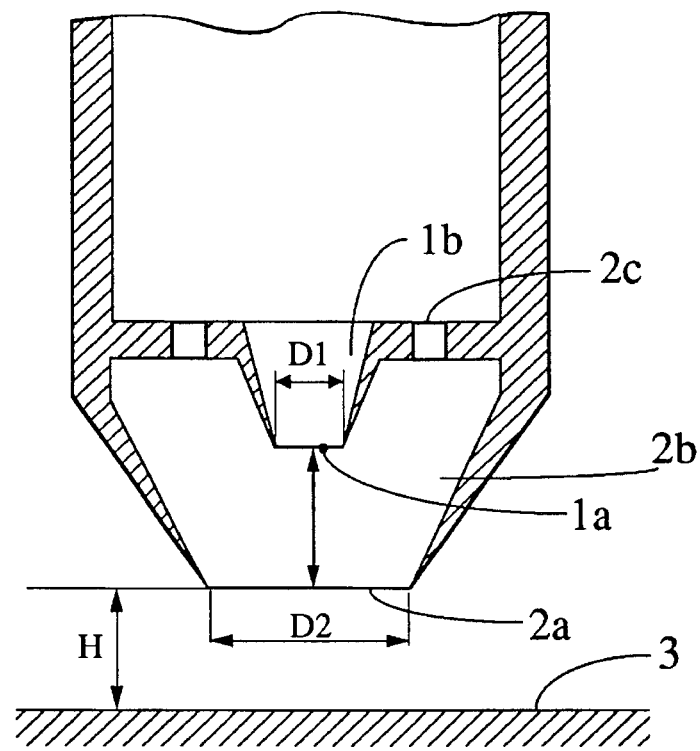
FIG. 7 is a longitudinal cross-sectional view which shows the positional relationship between the jet outlets of machining head of the embodiment 1.

FIG. 7 is a longitudinal cross-sectional view which shows the positional relationship between the jet outlets of machining head of the embodiment 1. More precisely, FIG. 7 illustrates the relation between the locations of main assist gas nozzle jet outlets 1a and main assist gas nozzle duct 1b and also the relation of distance between the cutting work surface 3 and the lower edge of the nozzle (jet outlet). The letter L in the figure indicates the distance between the sub assist gas jet outlet 2a and the main assist gas nozzle jet outlet 1a, and the letter H in the figure indicates a distance between a cutting work surface 3 and the lower edge of the sub assist gas jet outlet 2a (jet outlet).

Figure 8:
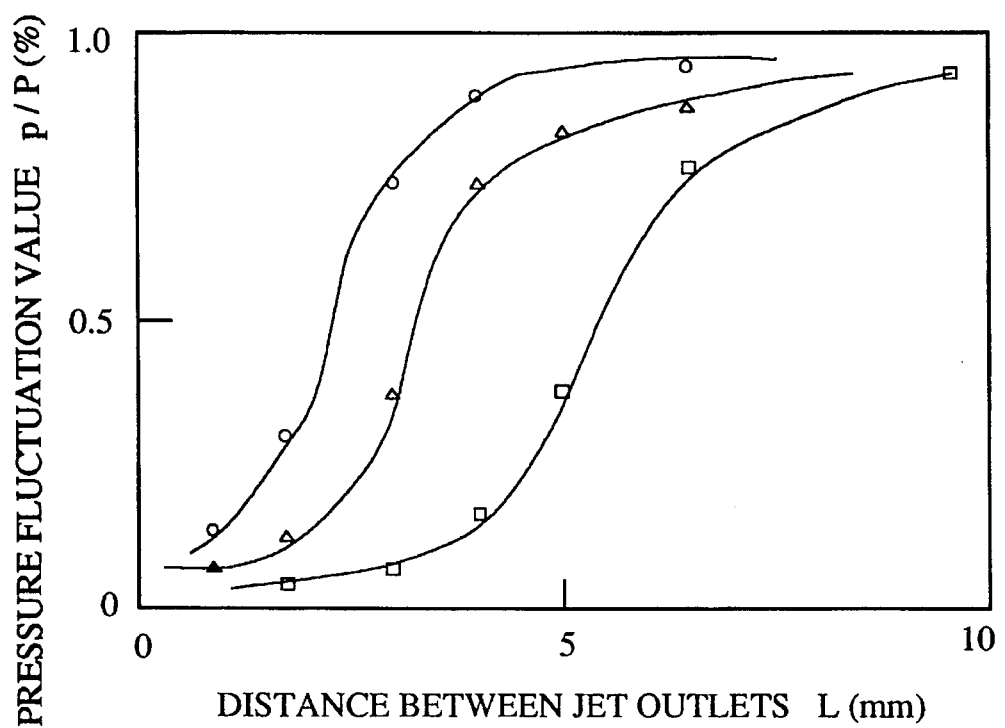
FIG. 8 illustrates relationship of the pressure fluctuation value of assist gas flow as a function of the distance L between main and sub jet outlets of the first embodiment.

FIG. 8 illustrates relationship of the pressure fluctuation value p/P(%) just below the center axis of nozzle against the distance L between the main jet outlet and the sub jet outlet of the embodiment 1, while H is changed, where H is a distance in millimeter from the cutting work surface 3 to the lower edge of the nozzle 2a. The test is carried out under the condition of diameters of $D_1$=1.5 mm, $D_2$=5 mm. The vertical scale indicates a pressure fluctuation value p/P(%), the horizontal scale indicates a distance L between the main jet outlet 1a and the sub jet outlet 2a. The curve labelled ○ indicates a characteristic for H=4 mm, the curve labelled △ indicates a characteristic for H=2 mm, and the curve labeled □ indicates a characteristic for H=1 mm.

From FIG. 8, the condition in which the pressure fluctuation value is more than 0.8% is obtained as;

$$H+L \geq 5D_1$$

If $L \geq 5 \times D_1$, then the machining tolerance against the nozzle height H improves. Therefore, a large pressure fluctuation is obtained by simple construction.

Embodiment 2

Figure 9:
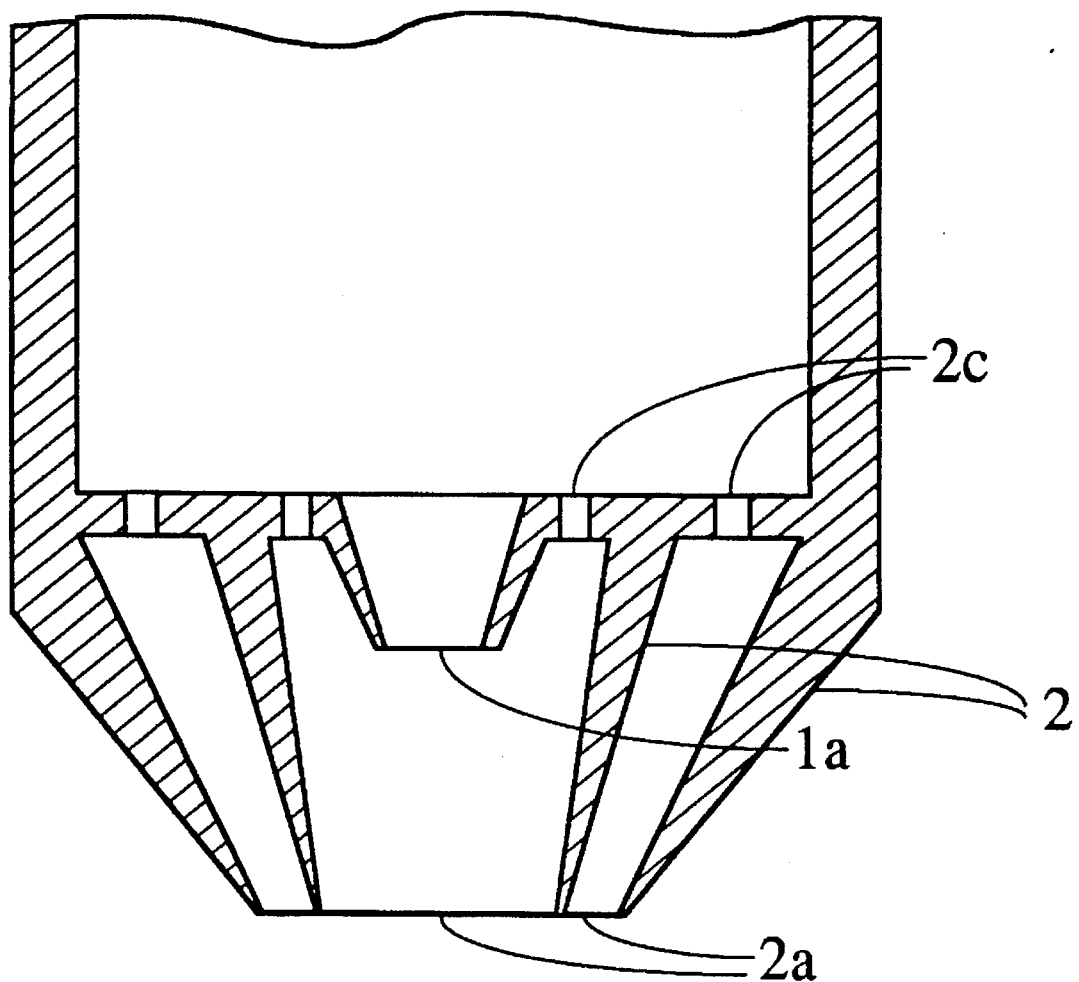
FIG. 9 illustrates a machining head according to a second embodiment.

FIG. 9 illustrates a machining head according to a second the embodiment. Although the machining head in the above embodiment comprises one main assist gas nozzle 1 and one sub assist gas nozzle 2, it is needless to say that the sub assist gas nozzle 2 may be constituted as a multiplex type construction as indicated in the longitudinal cross-sectional view of FIG. 9. In the second embodiment, if the jet outlet 1a of the main assist gas is located upstream of any one of the plurality of jet outlets 2a, the second embodiment has effects similar to these of the first embodiment.

Embodiment 3

Figure 10A:
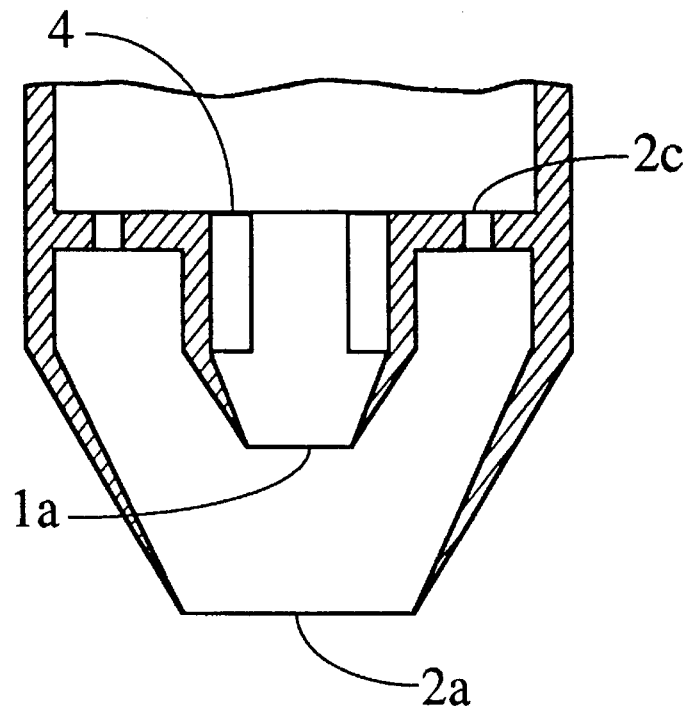
FIGS. 10A, 10B, 10C are a cross-sectional view and perspective views which illustrate the inside of a machining head according to a third embodiment.
Figure 10B:
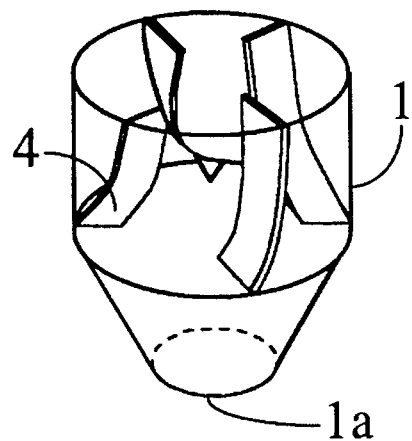
Figure 10C:
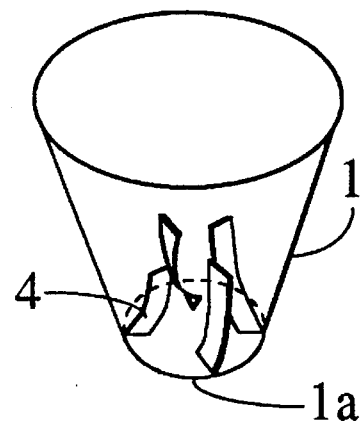

FIGS. 10A, 10B and 10C are a cross-sectional view and two perspective views which illustrate the inside of the machining head according to a third embodiment. In the third embodiment, a plurality of static wings twisted in a screw shape are mounted on the inner surface of the main assist nozzle 1 for causing twisting flows which increases the pressure and flow velocity fluctuation of the main assist gas flow. FIG. 10A illustrates a longitudinal sectional view of the machining head of this third embodiment.

FIG. 10B illustrates a perspective view showing the inside of the main assist gas nozzle 1. A plurality of the twisted static wings 4 are installed on the straight portion inside the duct wall of the main assist gas nozzle 1. These static wings 4 generate a circulating gas flow which flows inside the main assist gas nozzle. The jet flow has a large turbulent flow strength at the center axis when it includes a circulating component at the jet outlet portion. The turbulent ratio may reach more than 10% in case where the distance from the nozzle to the cutting work surface is substantially equal to the nozzle diameter. Therefore, the oxidized burning reaction is effectively caused, oxidation velocity is accelerated and the machining quality and the stability are improved accordingly. The high-speed cutting may be attained simultaneously.

In the embodiment for circulating at least a part of main assist gas flow, it is possible to generate a flow velocity fluctuation in the main assist gas even if the relative distance L from the lower edge of the main assist gas nozzle (namely, jet outlet 1a) to the lower edge of the sub assist gas nozzle (namely, jet outlet 2a) is set to zero.

In the above embodiment, the diameter of laser beam at the lower edge of the main assist gas nozzle must be large so as to locate the main assist gas more closely to the machining optical lens side. Therefore, it is comparatively difficult to align the laser beam axis with the nozzle center axis and to adjust the distance between the laser beam focal point and the work surface. However, in this embodiment, the above adjustment can be easily achieved since the flow velocity of the main assist gas varies even if the relative distance L between the jet outlets of both nozzles is set to zero.

FIG. 10C is a perspective view which illustrates the inside of the machining head of the third embodiment. The static wings may be installed at a contraction flow portion of the lower stream of the main assist gas nozzles shown in FIG. 10C.

Embodiment 4

FIGS. 11A, 11B are perspective view which shows the main assist gas nozzle of the machining head according to a fourth embodiment. In this fourth embodiment illustrated in FIG. 11A, a plurality of twisted grooves 5 are provided at a straight portion inside the duct wall of the main assist gas nozzle 1 as circulation flow forming means. The turbulent flow strength at the central part of the main assist gas jet flow increases since a part of the main assist gas (oxygen gas) flows through the main assist gas nozzle 1 and generates a circulating flow along the twisted grooves 5. Therefore, in this case, oxidization velocity is promoted, and the cutting velocity and the cutting quality may be improved.

The twisted groove 5 may be installed in a contraction flow portion located at the lower stream of the main assist gas nozzle 1 as illustrated in FIG. 11B.

Embodiment 5

FIGS. 12A, 12B illustrate main assist gas nozzles of the machining head of the embodiment 5. FIG. 12A is its top view, FIG. 12B is its longitudinal cross-sectional view. In this embodiment 5, main assist gas nozzles 6a are installed at the inside wall of the main assist gas nozzle 1 as the circulation flow forming means, and sub flow nozzles 6 of the main assist gas are installed symmetrically with respect to one another, which discharge gas in a circumferential direction in parallel to the main assist gas nozzle 1 (namely, the sub flow of main assist gas is discharged in the tangential direction of the outside circle of the main flow of the main assist gas). In the above construction, part of the main assist gas is discharged through the sub flow nozzles 6 of main assist gas and the main assist gas is circulated accordingly. Therefore, the same effects are achieved in this fifth embodiment as in that of in third and fourth the embodiments.

Embodiment 6

Figure 13:
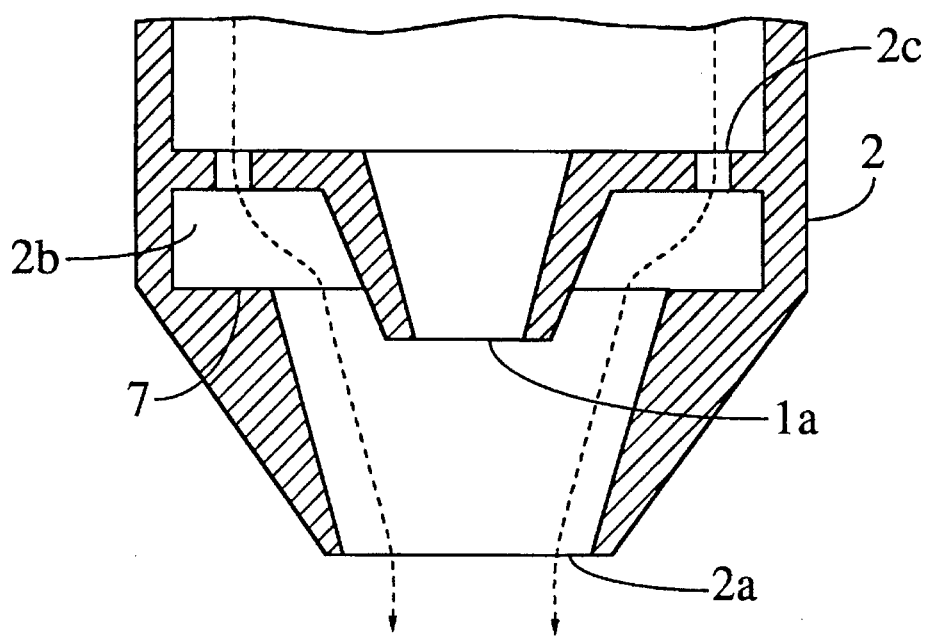
FIG. 13 is a longitudinal cross-sectional view which illustrates a machining head of a sixth embodiment.

FIG. 13 is a longitudinal cross-sectional view which illustrates the machining head according to the sixth embodiment. In this sixth embodiment, a static pressure conversion means (a static pressure conversion surface 7, in this case) which converts the dynamic pressure of the sub assist gas flow supplied through the gas supply inlet 2c to static pressure are installed at the location where the gas flow pass through the gas duct 2b. Broken line arrows show the assist gas flows. Since the gas directed toward the inside of the assist gas nozzle 2b is recovered to the static pressure after colliding against static pressure conversion surface 7, the assist gas flows homogeneously in the lower stream of static pressure conversion surface 7 and is discharged through the jet outlet 2a of the sub assist gas. The gas flow outside the nozzle, therefore, becomes homogeneous with less turbulence and inflow of ambient air is effectively prevented.

In this sixth embodiment, the static pressure conversion surface 7 is installed at the flat portion parallel to the bottom surface of the nozzle outlet 2a. However, a similar effect is obtained if the static pressure conversion surface 7 is not parallel to the bottom surface 2a or it is not installed at the flat surface, if it collides with the gas which is directed to the flow path of the circumference flow nozzle (namely, sub assist gas nozzle) and causes the gas flow to recover to the static pressure.

Embodiment 7

Figure 14:
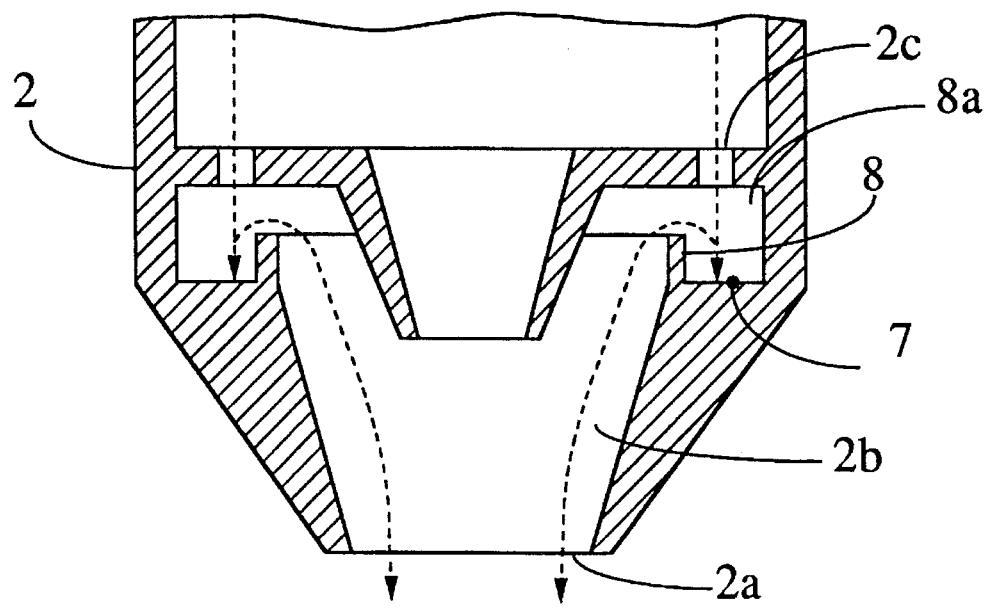
FIG. 14 is a longitudinal cross-sectional view which illustrates a machining head of a seventh embodiment.

FIG. 14 is a longitudinal cross-sectional view which illustrates a machining head according to a seventh embodiment. In this seventh embodiment, an annular return wall surface 8 protrudes at the edge of static pressure conversion surface 7 which is provided inside the sub assist gas duct 2b of the embodiment 6. The return wall surface 8 forms a gas residence space 8a, where the upper edge of the return wall surface and inside circumference nozzle are adjusted. In the case shown, the height is adjusted so that the appropriate clearance exists between the upper edge of the return wall surface 8 and the outside wall of the main assist gas nozzle 1.

The broken line arrows in FIG. 14 illustrate the directions of gas flow. The gas flow supplied through the gas supply inlet 2c temporarily fills the gas residence space 8a, which is comprised of the return wall surface 8, the inside wall of the sub assist gas nozzle 2 and the static pressure conversion surface 7, and then the static pressure of the gas flow is recovered. The gas flows with homogeneous flow velocity from the upper edge of the return wall surface 8 to the duct 2b of the sub assist gas nozzle, then the gas is discharged toward the outside through the jet outlet 2a. Therefore, the outside circumference flow becomes a steady and homogeneous flow with less turbulence and the inflow of the air improved more effectively.

Figure 15:
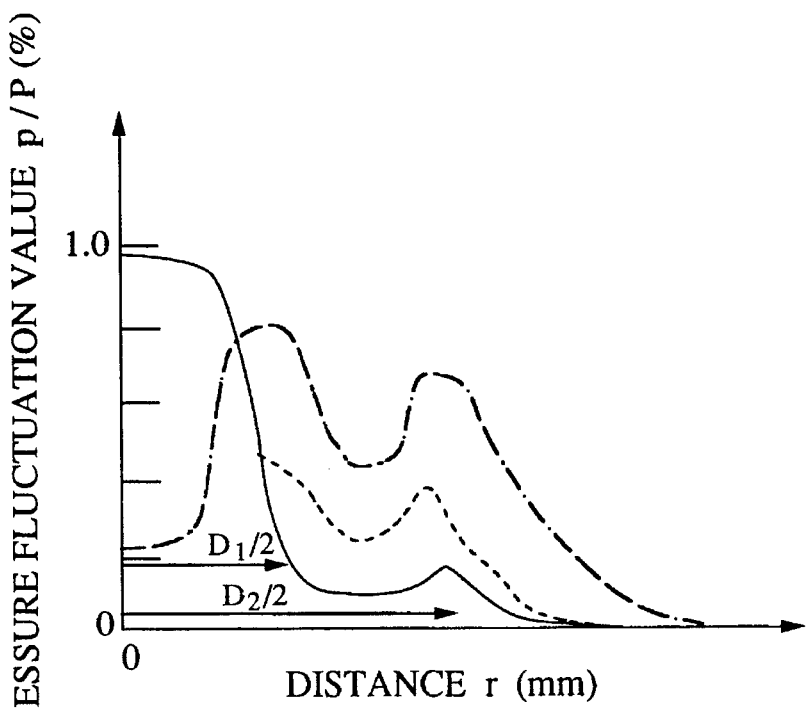
FIG. 15 illustrates the pressure fluctuation value of assist gas flow on the work surfaces as a function of the distance in a radial direction regarding the sixth and seventh embodiments and a conventional example.

FIG. 15 illustrates a characteristic curve which shows the pressure fluctuation value of the assist gas flow on the work surface versus distance from the center axis toward the radial direction regarding the sixth and seventh embodiments and the conventional example. The vertical scale indicates the pressure fluctuation value p/P(%), and the horizontal scale indicates distance r(mm) from the center axis of the nozzle toward radius direction. In FIG. 15, the solid line shows the characteristic curve for the seventh embodiment, the broken line shows that of sixth embodiment and the short dash line shows that for the conventional example. From the figure, in the case of the seventh embodiment, it is easily understood that the pressure fluctuation value of sub assist gas at the cutting work surface is smallest and the gas flow is most homogeneous with a steady state. Therefore, the amount of inflow of the surrounding air is decreased and the oxygen purity is kept at a high level.

Embodiment 8

Figure 16:
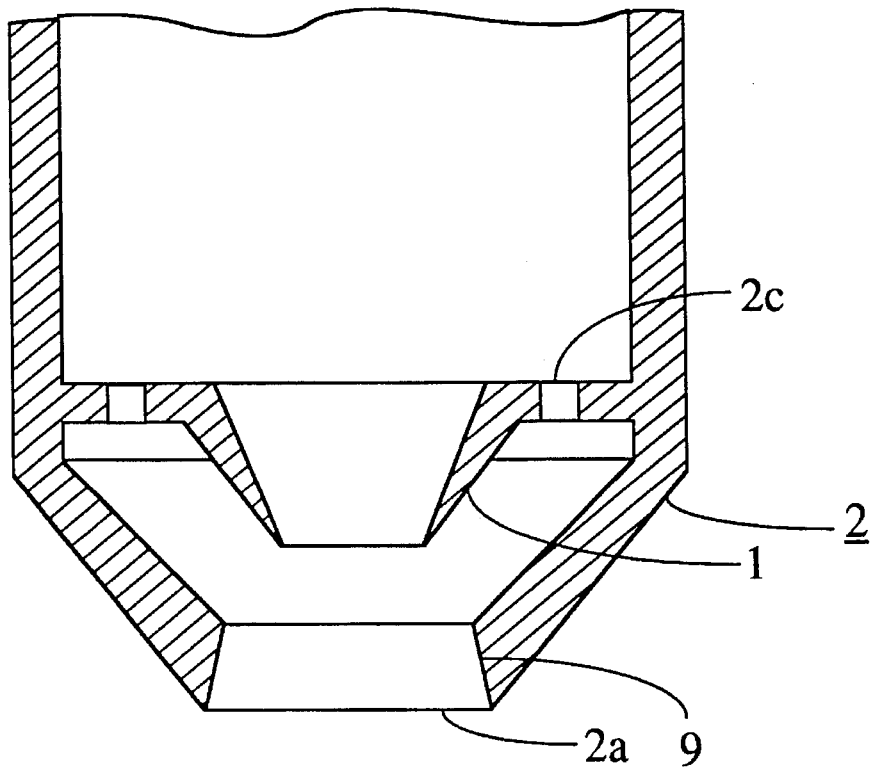
FIG. 16 is a longitudinal cross-sectional view which illustrates a machining head of the embodiment 8 in the invention.

FIG. 16 is a longitudinal cross-sectional view which illustrates a machining head of the laser machining apparatus according to an eighth embodiment. In the eighth embodiment, an expanded flow path 9 is formed at the front edge of the sub assist gas nozzle 2 where the flow path expands gradually towards the sub assist gas nozzle jet outlet 2a. According to the above construction, the sub assist gas (oxygen gas) discharged from the sub assist gas nozzle 2 does not accelerated, and flows parallel to the nozzle center axis without being separated from the inside nozzle wall. Therefore, the inflow of surrounding air into the surrounding flow can be minimized immediately down stream of the nozzle jet outlet, and high oxygen purity can be maintained, and steady machining can be attained. In this embodiment, the flow path area gradually expands, but a similar effect is obtained if the flow path area remains constant.

Embodiment 9

Figure 17:
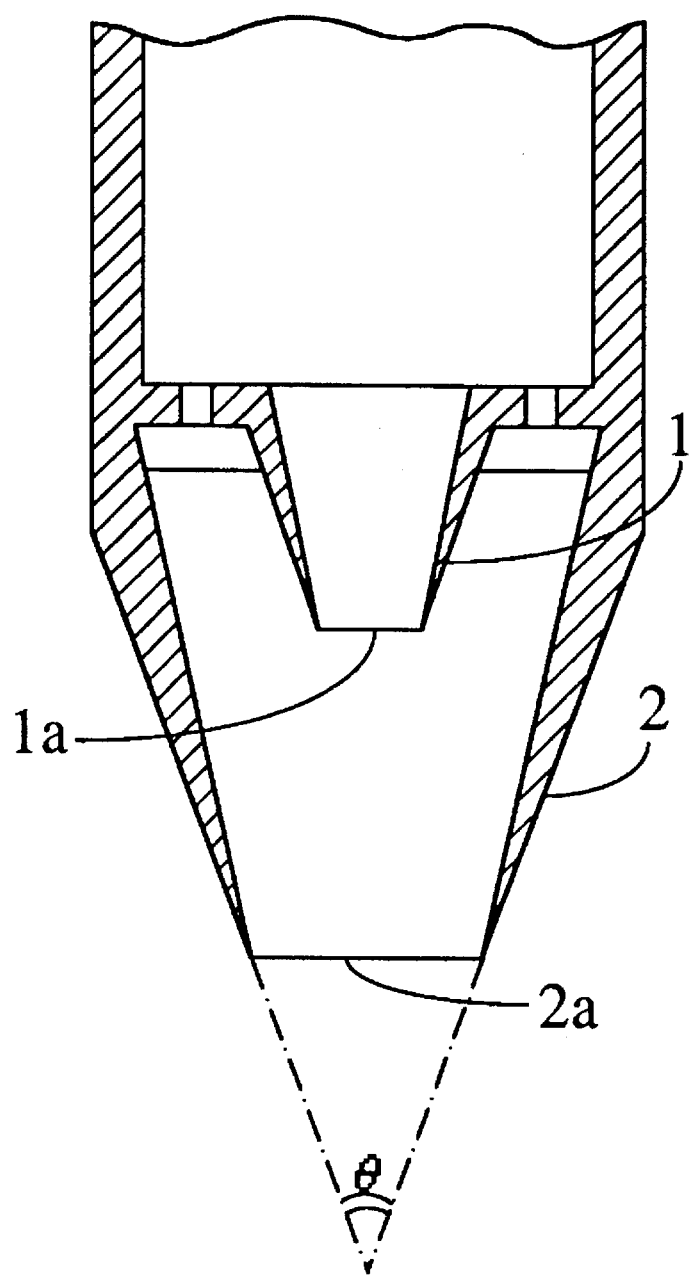
FIG. 17 is a longitudinal cross-sectional view which illustrates a machining head of a ninth embodiment.

FIG. 17 is a longitudinal cross-sectional view which illustrates a machining head according to a ninth embodiment. In the ninth embodiment, the outermost wall of the multi-nozzles, namely, the sub assist gas nozzle 2, is formed as a cone-shaped trapezoid which has virtual top angle θ less than 45 degrees. According to the above construction, it is possible to minimize the amount of assist gas which stays between the laser beam nozzle and the work surface and to prevent self burning. Moreover, it is possible to minimize the amount of inflow of surrounding air down stream of the surrounding nozzle, namely, from the sub assist nozzle outlet. Further, high oxygen purity is maintained and stable machining can be attained.

Embodiment 10

Figure 18:
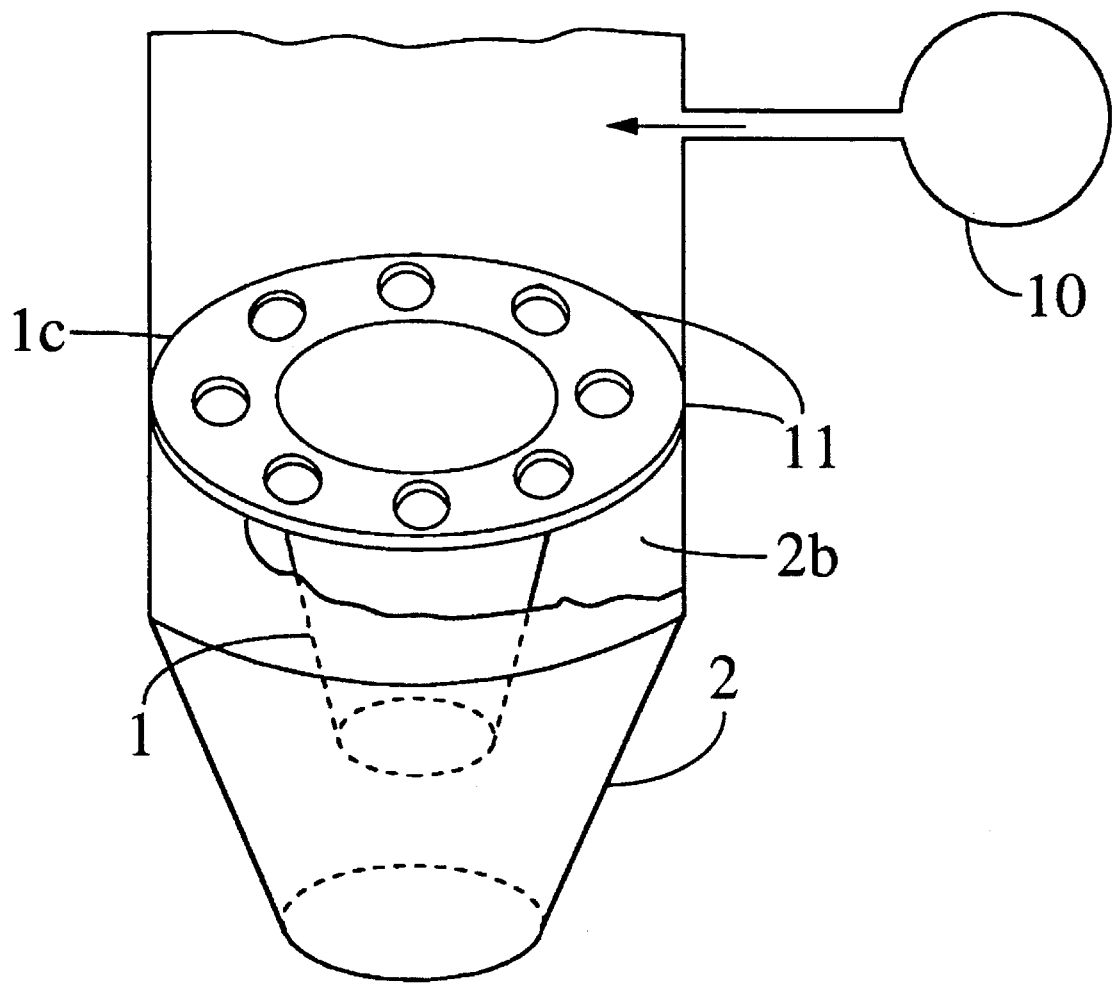
FIG. 18 is partial perspective view which illustrates a machining head of a tenth embodiment.

FIG. 18 is partial perspective view which illustrates a machining head according to a tenth embodiment. In this tenth embodiment, a common assist gas (oxygen gas) source 10 is installed upstream of the nozzle. The gas supplied from the assist gas source 10 branches to the main assist gas supply inlet 1c and to the plurality of small holes 11 on the surrounding annular portion of the main assist gas nozzle 1 at the center nozzle. The assist gas (oxygen gas) flows into the sub assist gas nozzle duct 2b through the small holes 11.

In this embodiment, the amount of main assist gas (oxygen gas) flow discharged from the center flow nozzle, namely, main assist gas nozzle 1 and the amount of sub assist gas (oxygen gas) flow discharged from the surrounding flow nozzle, namely, the sub assist gas nozzle 2 are variable according to the preset value of area of the small holes 11 and the number of the small holes 11. Therefore, a desired amount of the main assist gas and the sub assist gas can be easily obtained by selecting the appropriate nozzle, namely, the nozzle with the appropriate area and appropriate number of small holes 11, according to the quality and thickness of the material to be machined. The machining head nozzle of this embodiment has especially significant effects for cutting a thick plate. Usually, in case of a mild steel plate which is cut by using oxygen gas as assist gas, since the material temperature is low below the cutting groove, viscosity of oxide increases, discharge velocity decreases and burning reaction is restrained, time lag at the front surface of the machining material increases according to the quantity of thickness.

Accordingly, in order to keep the machining in a high speed and stable state, it is necessary to provide a high speed oxygen gas to a portion having time lag, and to take away the oxide material and to promote oxidation reaction. By setting an appropriate sub assist gas nozzle flow rate using the machining head nozzle of this embodiment, it is possible to satisfy the above condition.

Figure 19:
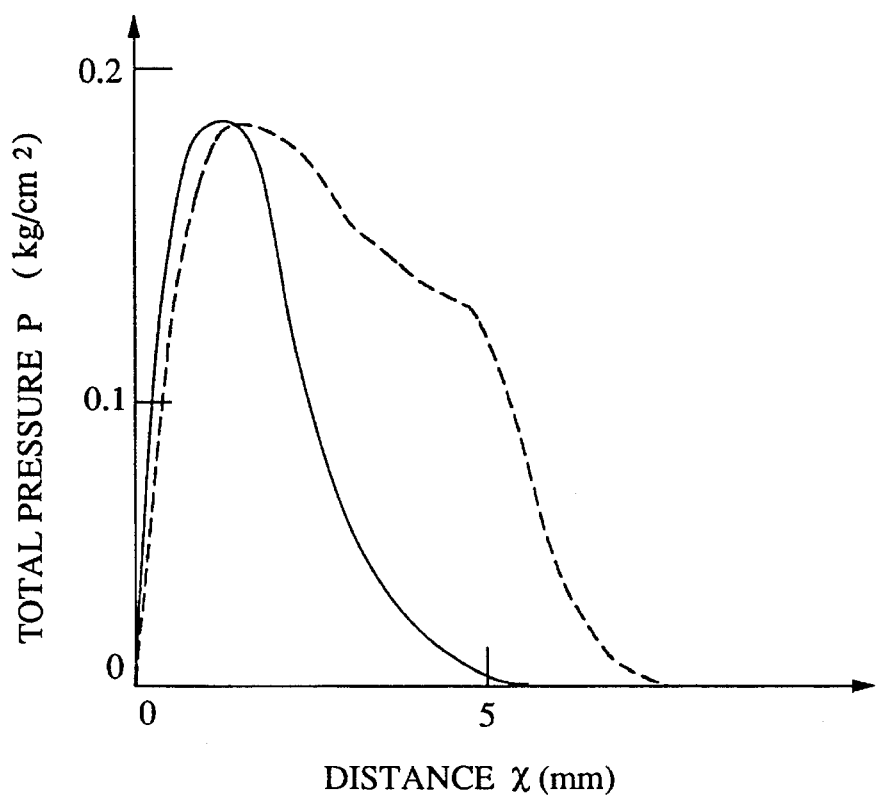
FIG. 19 illustrates difference of total pressure distribution generated by sub assist gas introducing small holes at a gas discharge portion of a lower groove of a tenth embodiment.

FIG. 19 shows characteristics of total pressure distribution of the gas along the groove direction which is supplied from the foot side of the groove, while the gas is supplied into the cutting groove using the machining head nozzle of this embodiment. In FIG. 19, the horizontal scale shows a distance $\chi$ (mm) from the front surface of the groove spacing and the vertical scale shows a total gas pressure P (kg/cm$^2$) at a lower edge of the groove.

The thickness of the plate is 25 mm, regarding each dimension of the nozzle, an inside diameter of the sub assist gas nozzle is $D_2$=4 mm, an inside diameter of the main assist gas nozzle is $D_1$=1.5 mm, inside diameter of a small hole 11 is 1 mm. The solid line shows a characteristic curve in case of eight introducing small holes and the broken line shows a characteristic curve in case of 24 introducing small holes. It is easily known from FIG. 19 that the flow quantity and flow speed of the sub assist gas is larger and high pressure are obtained over the wide area of the lower portion of the groove corresponding to the timing lag when many small holes exist.

Figure 20:
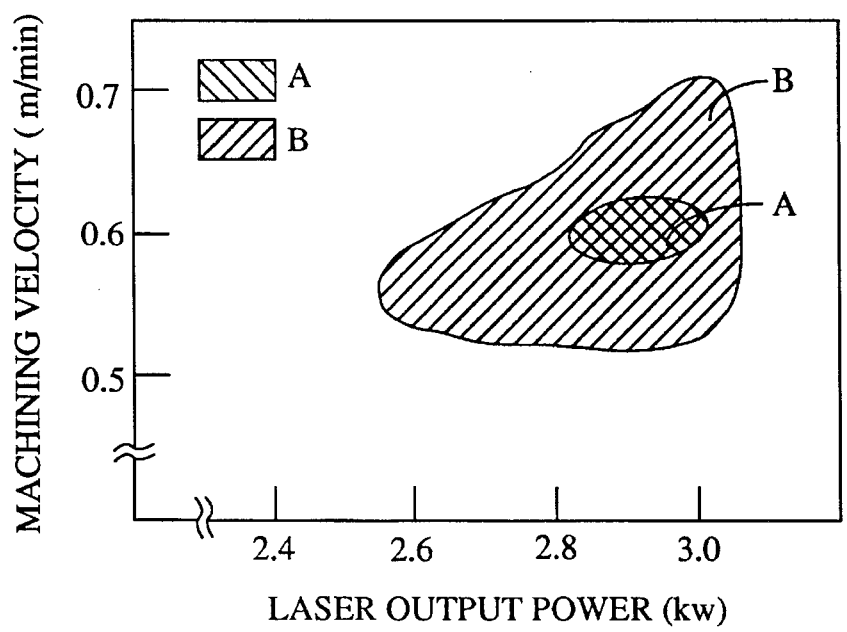
FIG. 20 shows difference of machining tolerance between the laser output and the machining velocity in case that the introducing small holes are different.

FIG. 20 shows difference of machining tolerance between the laser output power and the machining velocity in case that the introducing small holes are different. The horizontal scale shows machining velocity (m/min) and the vertical scale shows laser output (kw). As a machining material, SS400 plate material having thickness of 25 mm is used. Each dimension of nozzle is the same as those of in FIG. 19. Regarding dimension of the nozzle, an inside diameter of the sub assist gas nozzle is $D_2$=4 mm, an inside diameter of the main assist gas nozzle is $D_1$=1.5 mm, inside diameter of a small hole 11 is 1 mm. The area A shows an appropriate machining area in case of eight introducing small holes and an area B shows an appropriate machining area in case of 24 introducing small holes.

It is obviously known from the figures that machining tolerance spreads out and high speed cutting may be possible according to the increase of the introducing holes. When the flow quantity and flow speed of the sub assist gas are too large, a reasonable range of the flow quantity and flow speed of the sub assist gas will exist which realize a high quality machining, since a local self burning and wound are generated at the cutting surface.

Figure 21:
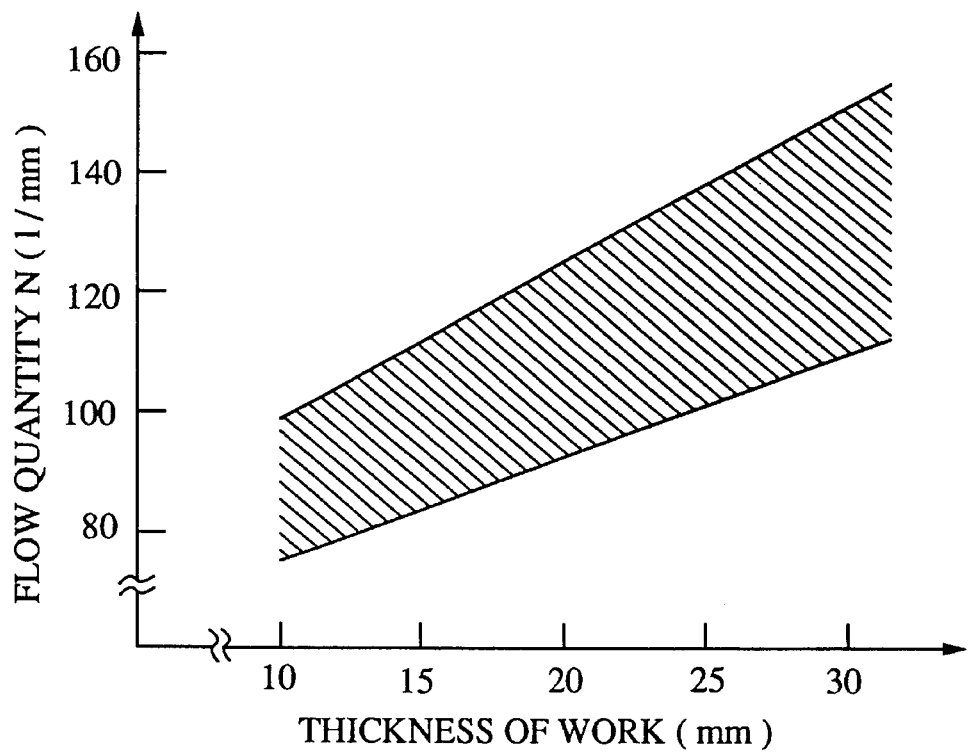
FIG. 21 shows an appropriate total flow corresponding to the thickness of the work material during cutting the thick plate.

FIG. 21 shows an appropriate total flow corresponding to the thickness of the work materials during cutting the thick plate. In the figure, the horizontal scale shows a thickness (mm) of the work and the vertical scale shows a total flow quantity N (l/min) of assist gas. The area shown with a slanted line is recommended for a good cutting range.

Figure 22:
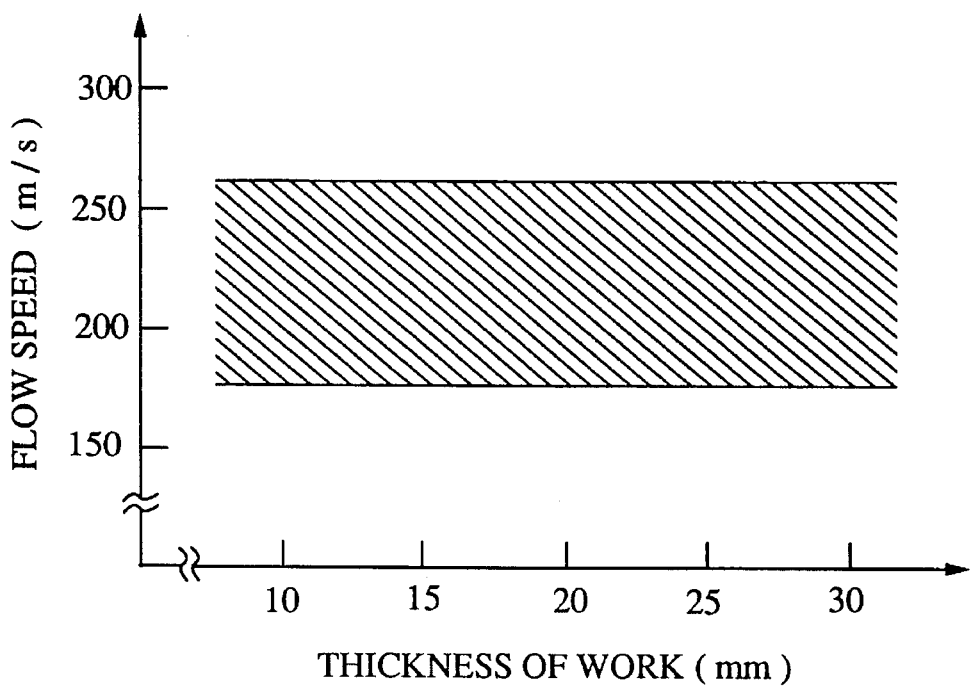
FIG. 22 shows an appropriate flow speed at the outlet of main assist gas nozzle flow during cutting the thick plate.

FIG. 22 shows an appropriate flow speed at the outlet of main assist gas nozzle flow during cutting the thick plate. The slanted line shows a recommended range for an appropriate cutting area.

Figure 23:
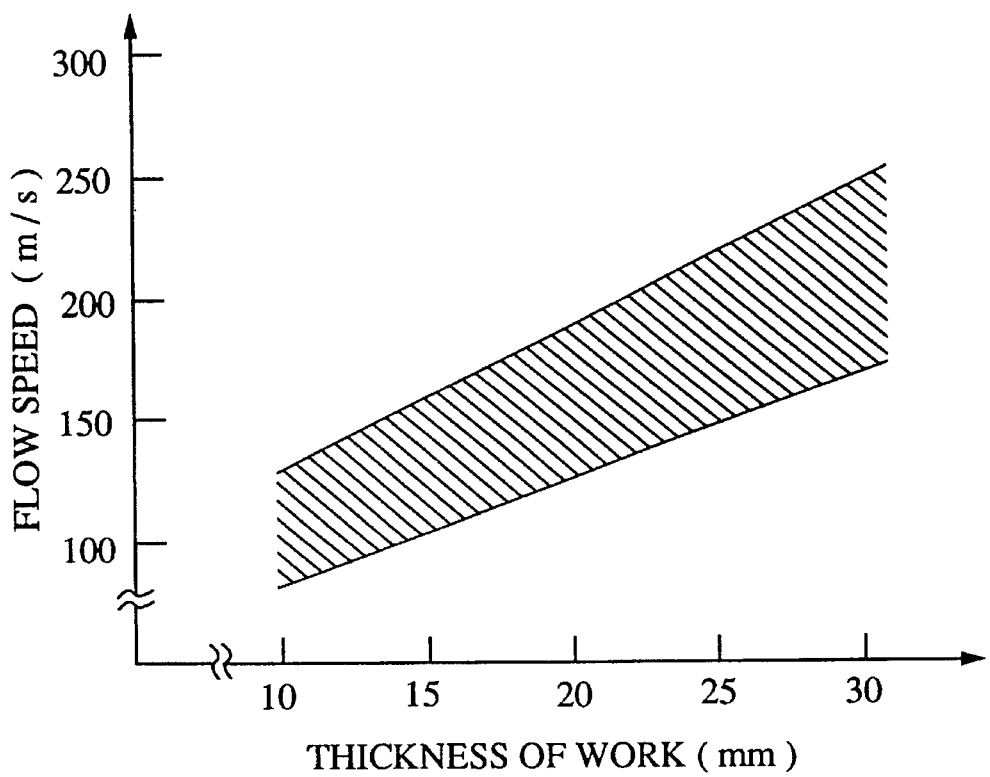
FIG. 23 shows an appropriate flow speed at the outlet of sub assist gas nozzle flow during cutting the thick plate.

FIG. 23 shows an appropriate flow speed at the outlet of sub assist gas nozzle flow during cutting the thick plate. The slanted line shows a recommended range for an appropriate cutting area.

When the machining head nozzle of the invention is used, it is possible to cut the plate in a high quality state without wound and dross adhesion within the flow quantity and flow speed shown in FIGS. 21–23. Therefore, a diameter and number of the small holes can be selected so that the appropriate quantity of the flow and the flow speed are realized.

Figure 24:
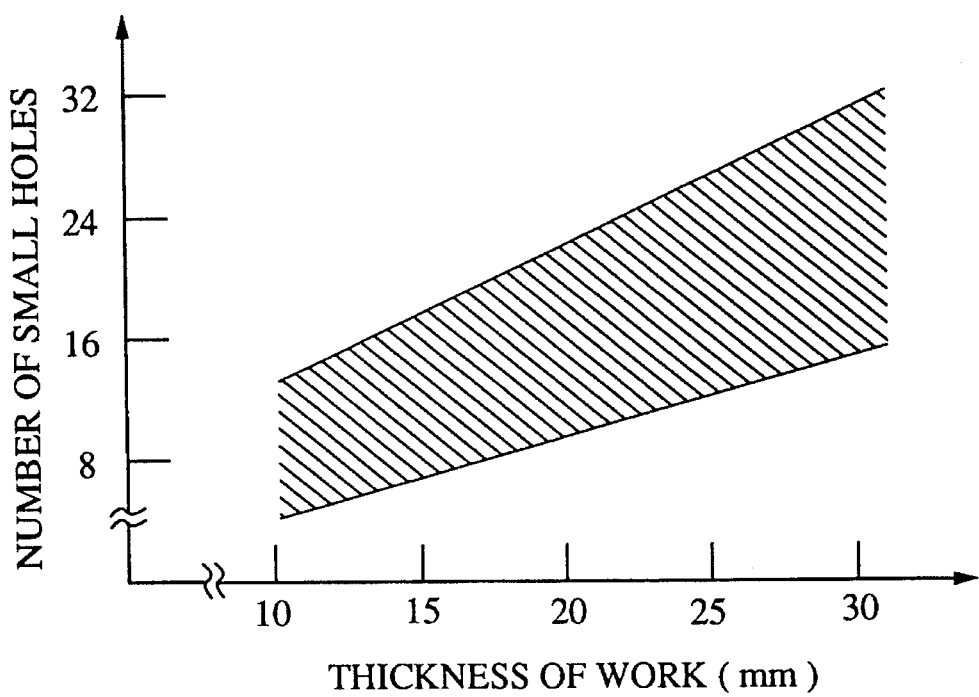
FIG. 24 shows a range of the number of small holes which are necessary for realizing the flow quantity and flow speed using the nozzle of the invention.

FIG. 24 shows a range of number of small holes 11 which are necessary for realizing the aforementioned flow quantity and flow speed using the nozzle of the invention. The vertical scale shows the number of small holes and the horizontal scale shows a thickness (mm) of the plate. The dimension of the nozzle is the same as those of FIG. 19, such that an inside diameter of the sub assist gas nozzle is $D_2$=4 mm, an inside diameter of the main assist gas nozzle is $D_1$=1.5 mm, inside diameter of a small hole 11 is 1 mm. For the dimension other than these condition, it is of course possible to cut the plate in a high quality state without wound and dross adhesion if conditions are selected to satisfy the flow quantity and the flow speed of FIGS. 21–23.

FIGS. 25A, 25B are plan views which illustrate other examples of small hole shapes for the assist gas supply inlet according to a tenth embodiment. In the above embodiment, the small holes 11 have circular shapes. However, it is needless to say that a similar effect is obtained if any shape of small holes 11 is used, for example, a rectangular or oval shape as illustrated in the plan views of FIGS. 25A, 25B, respectively.

Embodiment 11

FIG. 26 is a partial perspective view which illustrates a machining head according to an eleventh embodiment. In the above tenth embodiment, the flow path is adjusted by installing small holes 11 which are located at the annular portion surrounding the main assist gas supply inlets 1c and supply the sub assist gas to the sub assist gas nozzle 2.

However, in this the eleventh embodiment, the flow quantity of the assist gas is adjusted by a mesh type fluid resistance body 12 installed at the above annular portion as illustrated in FIG. 26. The fluid resistance body 12 may be a porous material. In this eleventh embodiment, the gas flow supplied to the sub assist gas nozzle 2 is homogeneous and a stable gas flow having less turbulence can be realized by selecting an appropriate mesh size of the fluid resistance body or appropriate porous material.

Embodiment 12

Figure 27:
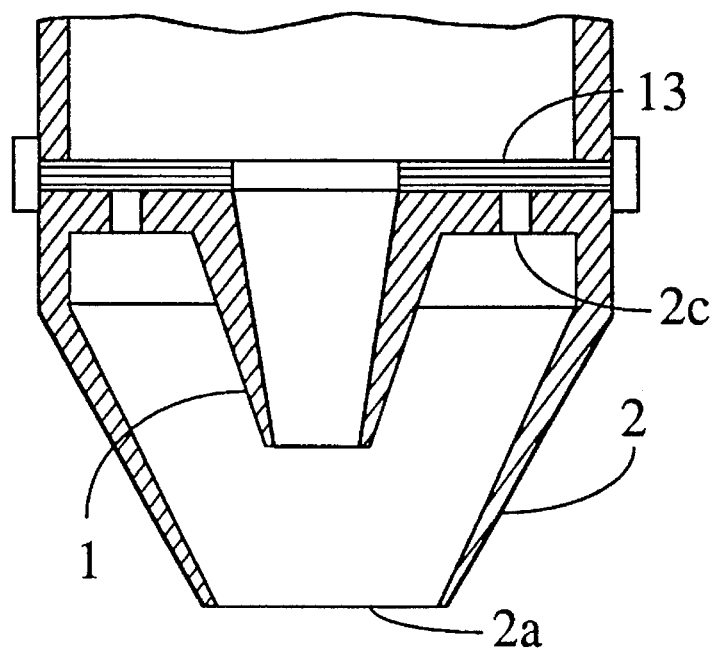
FIG. 27 is a longitudinal cross-sectional view which illustrates a machining head of a twelfth embodiment.

FIG. 27 is a longitudinal cross-sectional view which illustrates a machining head of the laser machining apparatus according to a twelfth embodiment.

In this twelfth embodiment, an aperture area adjusting means 13 is installed at the sub assist gas supply inlet of the sub assist gas nozzle 2. The aperture area of the aperture area adjusting means 13 can be adjusted manually or automatically using a driving apparatus. By using such a construction, the flow quantity of assist gas and the flow ratio of main assist gas versus the sub assist gas can be adjusted without replacing the nozzle, so that work can be carried out more effectively.

Embodiment 13

Figure 28:
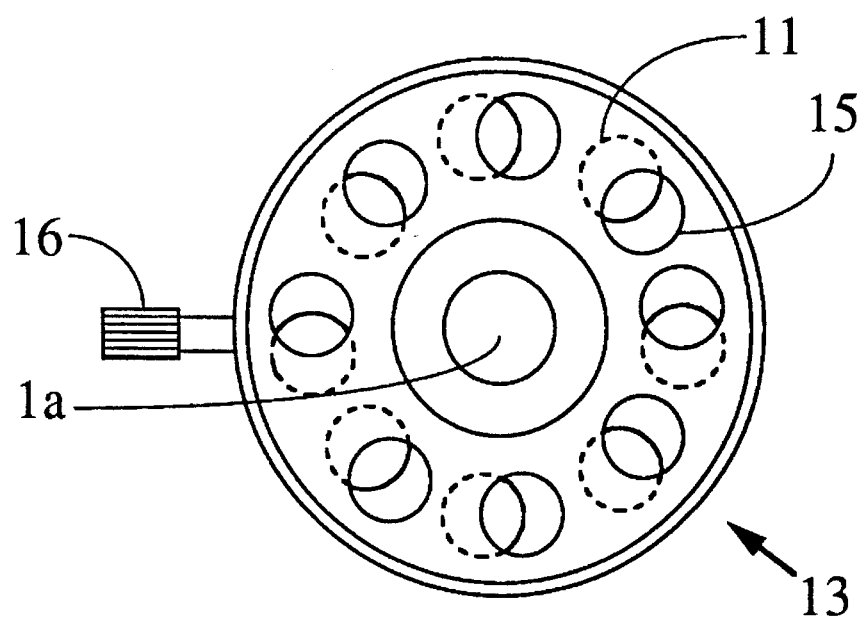
FIG. 28 is a plan view which illustrates an aperture area adjusting means of a thirteenth embodiment.

FIG. 28 is a plan view which illustrates an aperture area adjusting means according to a thirteenth embodiment, which separates the main assist gas flow from the sub assist gas flow.

In the thirteenth embodiment, a concrete example of construction of the aperture area adjusting means 13 of the above embodiment 12 is illustrated. In the embodiment, an annular disc 14 contacts the annular portion which has a plurality of small holes 11 for directing the assist gas to the sub assist gas nozzle. The annular disc 14 has a plurality of similar small holes 15 thereon and also has a knob 16 at the outside thereof. The annular disc 14 is moved manually to adjust the aperture area, where the small holes 11 overlap with the small holes 15, which supplies the sub assist gas to the sub assist gas nozzle. Therefore, the flow quantity of the assist gas to be supplied to sub assist gas nozzle can be easily adjusted by moving the annular disc 14 which varies aperture area of gas flow inlet.

Although the annular disc 14 is operated manually by the knob 16 connected to the outside nozzle in the embodiment, it is needless to say that automatic driving means may also be useful.

Embodiment 14

Figure 29:
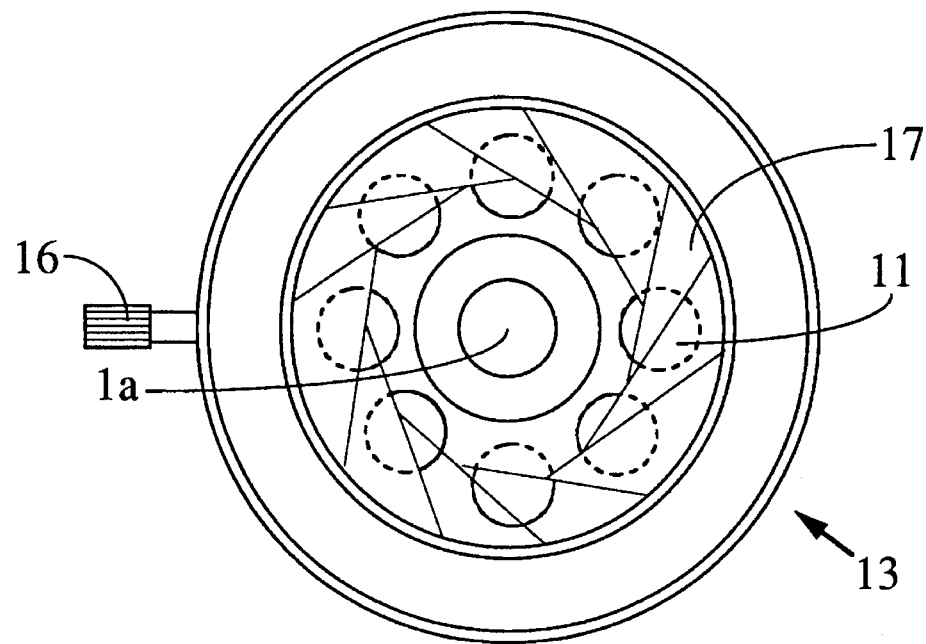
FIG. 29 is plan view which illustrates an aperture area adjusting means of a fourteenth embodiment.

FIG. 29 is plan view which illustrates an aperture area adjusting means according to a fourteenth embodiment.

In the fourteenth embodiment, another concrete example of an aperture area adjusting means is illustrated. The aperture area adjusting means of the fourteenth embodiment comprises a flow restriction means 17 which restricts the plurality of small round holes 11 which supplies assist gas to the sub assist gas nozzle. The aperture area adjusting means 17 also has a knob 16 which permits manual adjustment of the degree of restriction of the aperture area from the outside of the nozzle. The aperture area of the gas supply inlet for supplying the sub assist gas is varied by adjusting the restriction means 17, whereby the supply gas flow quantity can be adjusted.

Although aperture area adjusting means 17 is operated manually by the knob 16 connected to the outside nozzle in the embodiment, it is needless to say that automatic driving means may be useful.

Embodiment 15

Figure 30:
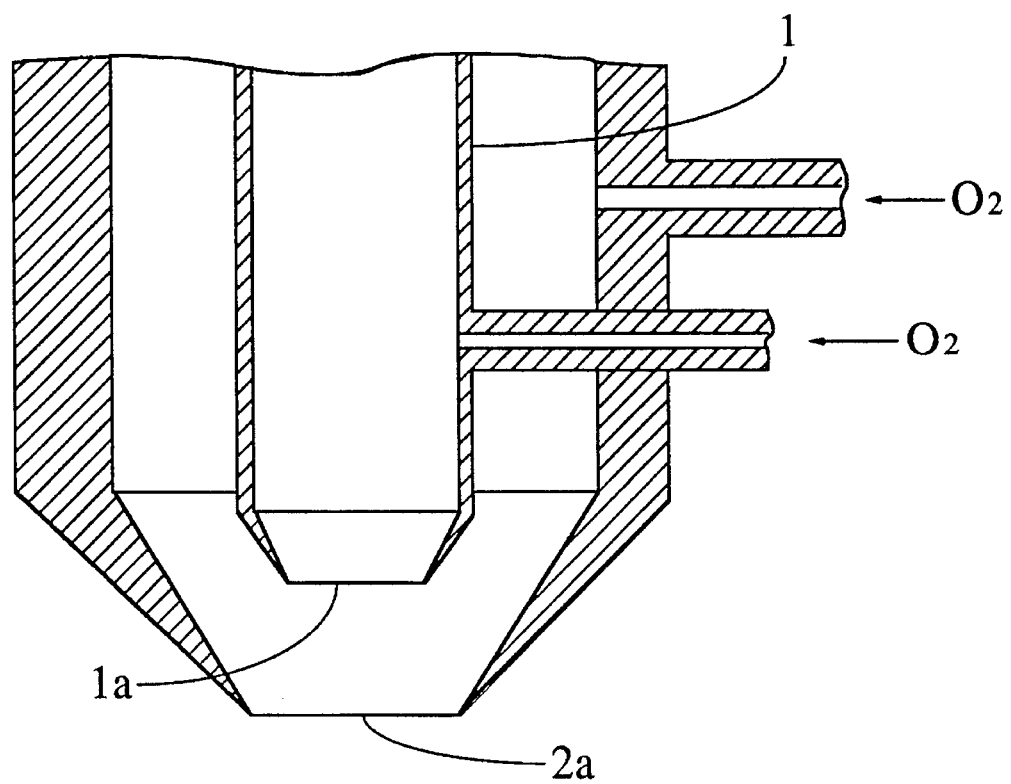
FIG. 30 is a longitudinal cross-sectional view which illustrates a machining head of a laser machining apparatus of a fifteenth embodiment.

FIG. 30 is a longitudinal cross-sectional view which illustrates a machining head of laser machining apparatus according to a fifteenth embodiment. In the fifteenth embodiment, a gas (oxygen gas) source for main assist gas nozzle 1 and a gas source for sub assist gas nozzle 2 are separately provided. Therefore, it is possible to supply the appropriate flow quantity of assist gas and to supply oxygen with appropriate flow quantity ratio of the main assist gas corresponding to the sub assist gas.

Embodiment 16.

Figure 31:
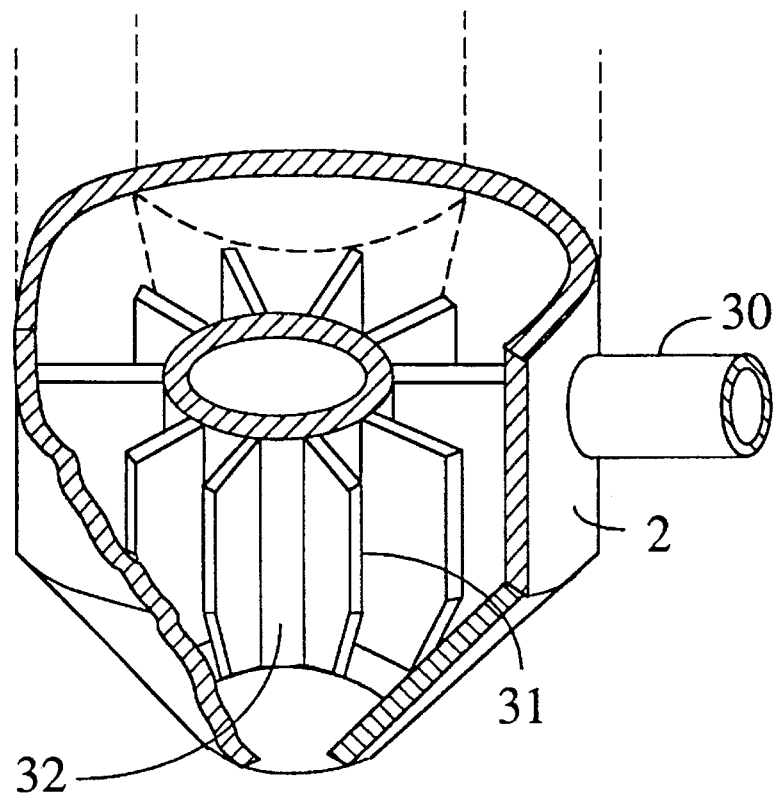
FIG. 31 is a partial cross-sectional perspective view which illustrate a laser machining nozzle of a sixteenth embodiment.

FIG. 31 is a partial cross-sectional perspective view which illustrate a laser machining nozzle according to an embodiment 16.

An assist gas supply inlet 30 is provided on the surface of the inside wall of sub assist gas nozzle 2 and the sub assist gas nozzle 2 is divided by a plurality of partition 31 and small room 32 is formed. The assist gas flows into the sub assist gas nozzle 2 from the assist gas supply inlet 30 and then is distributed into each small rooms 32 by decreasing the energy against the resistance of the partition wall 31. Accordingly, the flow speed distribution of circumferential direction at the outlet of the sub assist nozzle becomes homogeneous. Asymmetry flow at the sub assist gas outlet generated by biased assist gas supply inlet can be avoided.

In FIG. 31 of the present embodiment, the gas supply inlet is provided at one location and same partition walls are arranged in an axis symmetry. However, it is possible to form partition walls freely at the outlet of the sub assist gas nozzle, by varying the area of partition wall, height and spacing according to the location and number of the gas supply inlets.

Figure 32:
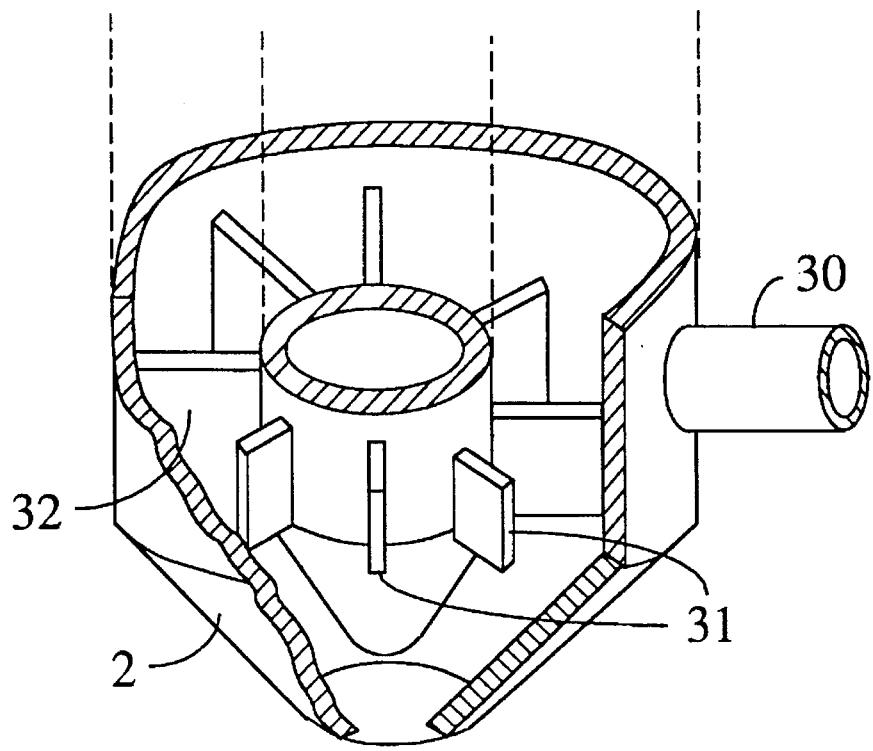
FIG. 32 is a partial cross-sectional perspective view which illustrates another machining head of a sixteenth embodiment.

As shown in the partial perspective view of FIG. 32, the height of the partition walls is shorter near the gas supply inlet, and is higher and narrower at the distance between the partition walls according to the increase of distance from the gas supply inlet, thereby it is possible to uniform an outlet flow at the assist gas nozzle outlet.

Embodiment 17

Figure 33:
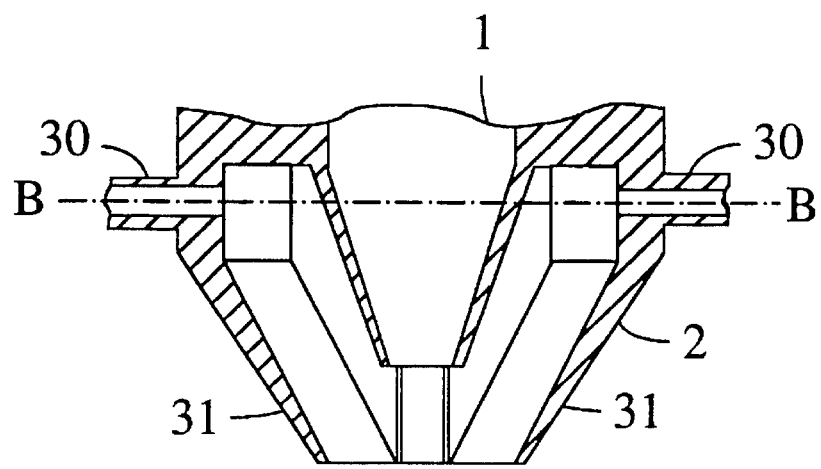
FIG. 33A is a longitudinal cross-sectional view of the present invention which shows a laser machining nozzle of a seventeenth embodiment.
FIG. 33B is cross-sectional view of the laser machining nozzle looked from the top at the cutting line B—B in FIG. 33A.
Figure 33:
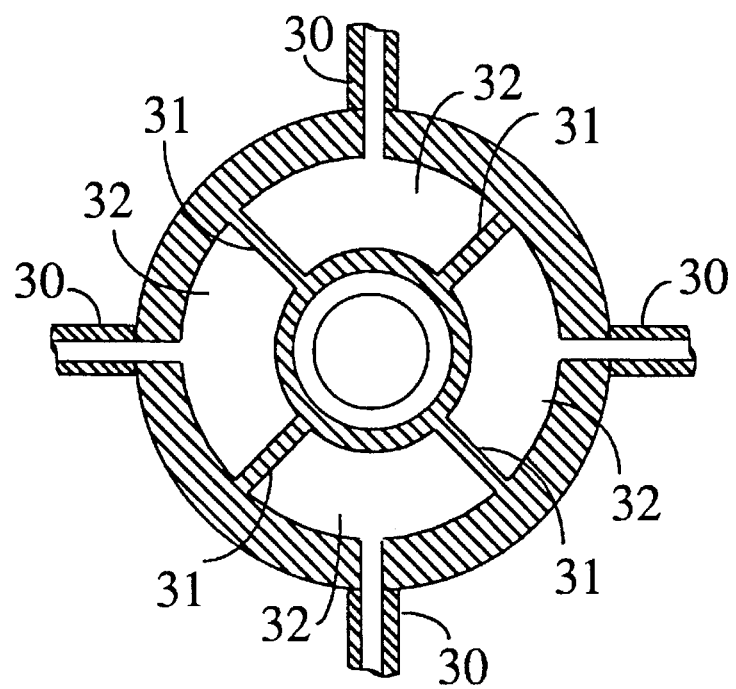

FIG. 33A is a longitudinal cross-sectional view of the present invention which shows a laser machining nozzle of an embodiment 17. FIG. 33B is cross-sectional view of the laser machining nozzle which looks a cutting surface from the top which is cut at the line B—B in FIG. 33A.

A plurality of assist gas supply inlets 30 are mounted radially on the surface of the inside wall of the sub assist gas nozzle 2. In this case, the number of assist gas supply inlets 30 is four, and small rooms 32 are divided by partitions 31 which are the same numbers as those of the assist gas supply inlets 30.

Figure 34:
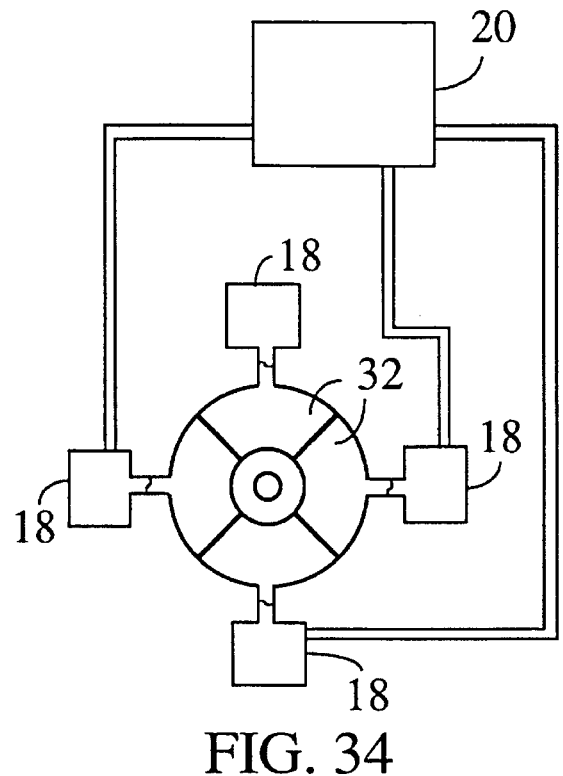
FIG. 34 shows an assist gas supply means which supplies the assist gas to the machining head of a seventeenth embodiment.

A shown in FIG. 34, each assist gas supply inlet 30 is connected to respective separate assist gas supply resources 18 and the gas flow from each supply resources 18 are controlled by a flow control apparatus 20.

Figure 35:
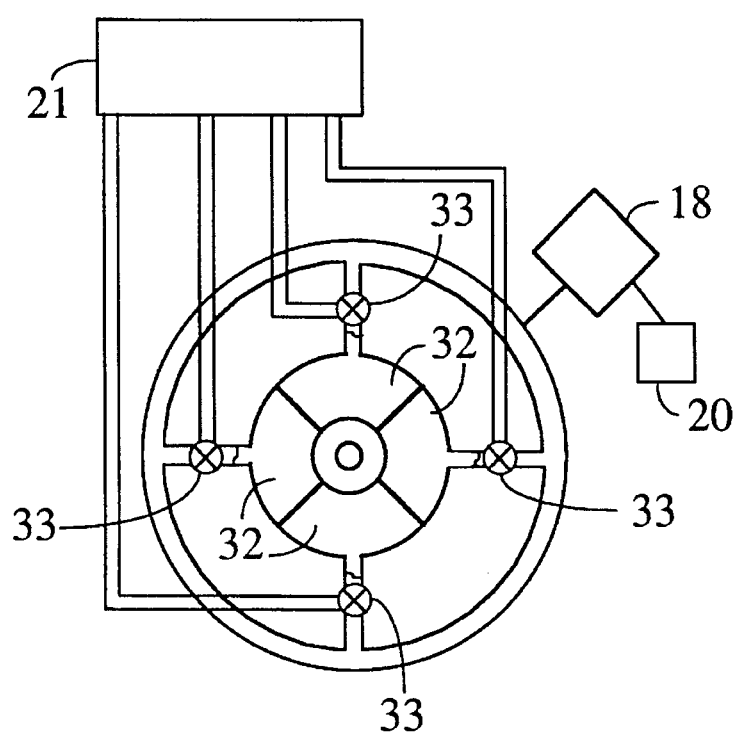
FIG. 35 shows another assist gas supply means which supplies the assist gas to the machining head of a seventeenth embodiment.

As shown in FIG. 35, each assist gas supply inlet is connected to the supply resource 18 via the valves 33, and the valves 33 are opened or closed by an operation control apparatus 21, respectively.

Figure 36:
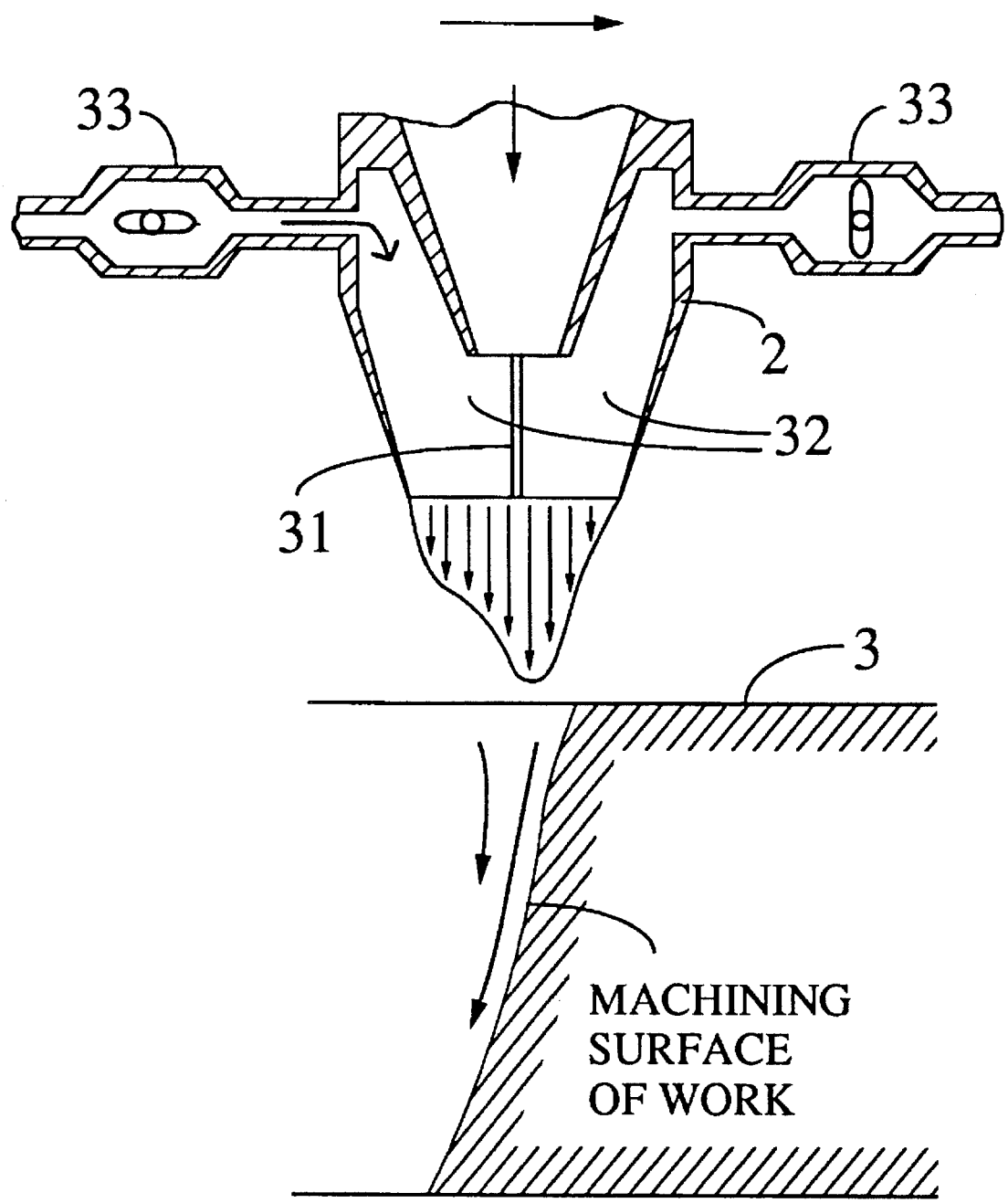
FIG. 36 shows a gas supply state in the gas flow quantity control using the machining head of the seventeenth embodiment.

In the present embodiment, the assist gas flow speed distribution at the outlet of the sub assist gas nozzle can be adjusted freely by adjusting the quantity of gas flow that is supplied to each small room. For example, as shown in FIG. 36, the flow speed backward the travelling direction of the nozzle is adjusted large and the flow speed forward the travelling direction of the nozzle is adjusted small by supplying the gas into the small room 32 which is located backward the travelling direction of the nozzle. Then, the assist gas is easily supplied inside the groove and high pressure is provided to the lower portion of the groove. Since the assist gas has a component toward the machining direction of the gas flow, the separation of the gas flow at the front surface of work is depressed and burning reaction is promoted, and then machining quality improves.

In this embodiment, four small rooms are included, but it is needless to say that it has similar effect if small rooms more than four or less than four are included. It is needless to say that it has similar effect if the number of the assist gas supply inlets 30 which lead the assist gas to each small room 32 is more than two. In this embodiment, although one gas supply resource or a plurality of supply resource supply the gas to one gas inlet, a plurality of supply resources may supply the gas to a plurality of gas supply inlets, respectively.

Embodiment 18

Figure 37:
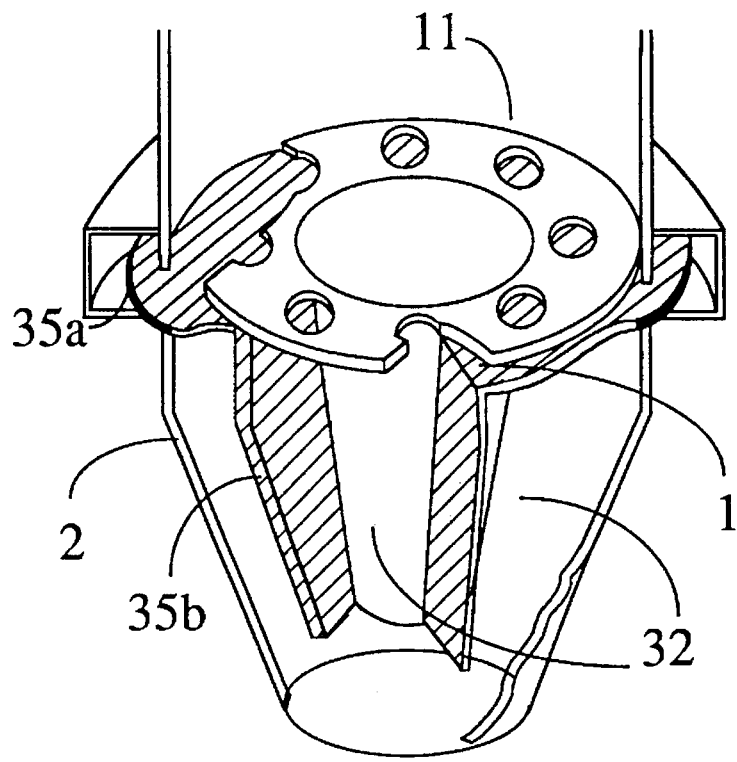
FIG. 37A is a partial cross-sectional perspective view of the machining head of eighteenth embodiment.
FIG. 37B is a longitudinal cross-sectional view of the machining head of eighteenth embodiment.
Figure 37:
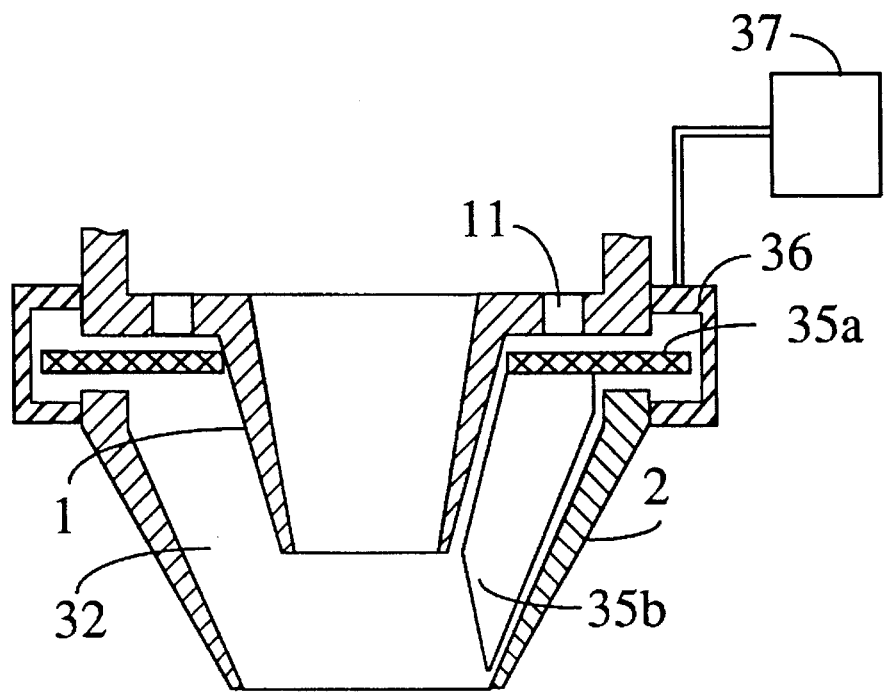

FIG. 37A, FIG. 37B show laser machining nozzles of an embodiment 18. FIG. 37A is a partial cross-sectional perspective view, FIG. 37B is a longitudinal cross-sectional view.

In the figures, an annular plate, or a fan shaped plate 35a is mounted, which contacts the side surface, at down stream of the annular partition having the small holes 11 which supply the sub assist gas. The fan shaped plate 35a interrupt the sub assist gas flow by interrupting a part of the small hole 11 which supply the sub assist gas. Partition plates 35b are fixedly assembled at the end portion of the fan shaped plate 35a so as to form a unit body.

This partition plates 35b correspond to the partitions 31 in the embodiments 16 and 17, which form small rooms inside the sub assist gas nozzle 2. The fan shaped plate 35a and the partition plates 35b are formed rotatably around the nozzle axis.

Further, the laser machining nozzles has a driving device 36 which drives the fan shaped plate 35a and the partition plates 35b, and a control unit 37 which drives the driving device 36. The sub assist gas flows into the small rooms 32 formed by the partition plates 35b, the inside wall of the sub assist gas nozzle 2 and the outside wall of the main assist gas nozzle 1, through the small holes 11 where the small holes 11 are not interrupted by the fan shaped plate 35a, and goes out from the sub assist gas nozzle outlet. Accordingly, a similar effect to that of the embodiment 17 is obtained by controlling the small rooms to be located behind the machining direction.

Embodiment 19

Figure 38:
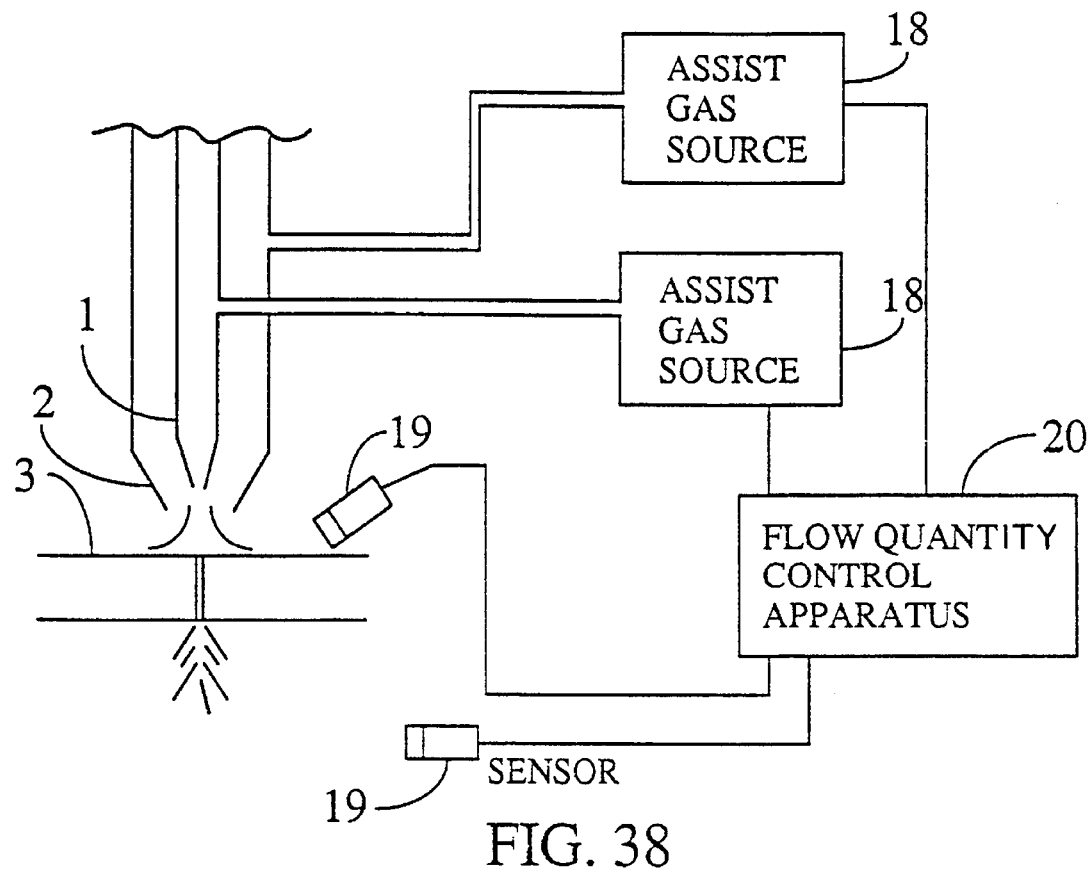
FIG. 38 illustrates the construction of a laser machining apparatus of a nineteenth embodiment.

FIG. 38 illustrates a construction of a laser machining apparatus according to a nineteenth the embodiment. The machining apparatus of the embodiment comprises respective assist gas (oxygen gas) sources 18, a control means 20 and sensors 19. The assist gas sources 18 supplies the assist gas to a machining head having a nozzle construction as shown in FIG. 30. The sensors 19 detect information regarding the temperature of the material surface, the groove width, and the amount of luminescence due to sparks during machining. The control means 20 adjusts the gas flow quantity and the gas flow pressure of the main assist gas and the sub assist gas which are discharged from the nozzles depending on the information from the sensors 19. According to this construction, it is possible to avoid abnormal machining and to attain stable machining.

The machining head having a nozzle construction has respective assist gas source in the nineteenth embodiment. But, in case that the same assist gas source is used, the same effect is obtained by providing a control apparatus for controlling the apparatus for automatically driving the sub assist gas flow control apparatus and the gas flow from the same gas source as shown in the thirteenth and fourteenth embodiments, instead of the control apparatus shown in FIG. 38.

Embodiment 20

Figure 39:
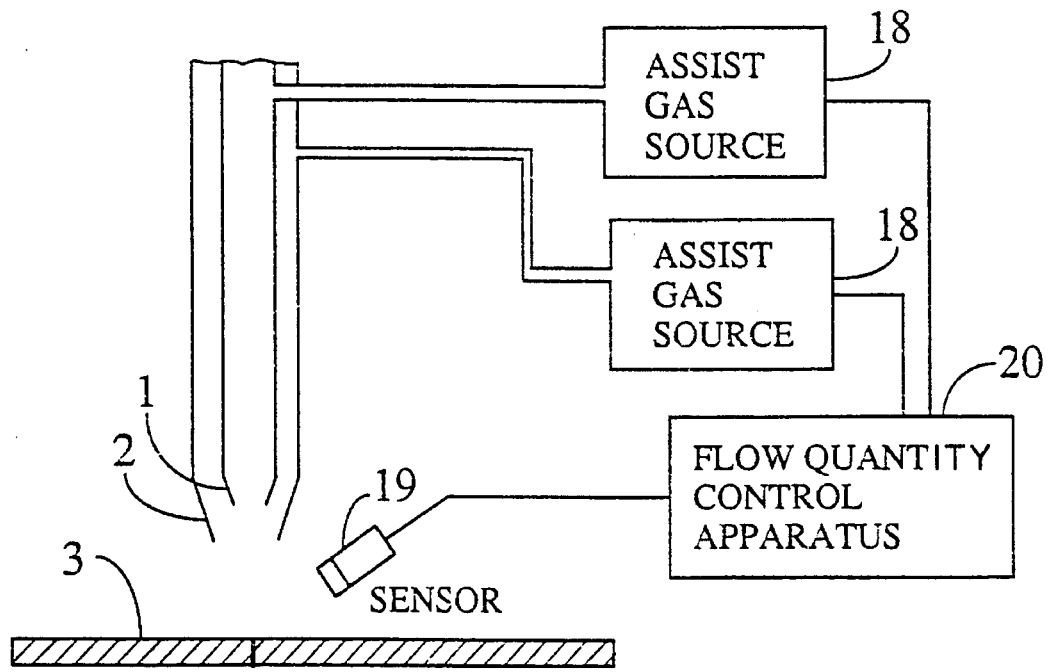
FIG. 39 illustrates a construction of a laser machining apparatus of a twentieth embodiment.

FIG. 39 illustrates a construction of a laser machining apparatus twentieth embodiment. The machining apparatus of the twentieth embodiment comprises a sensor 19 which predicts or detects self burning. The machining apparatus operates to decrease at least one of the gas pressure and the gas flow quantity of the main assist gas and the sub assist gas when self burning is predicted or detected according to the information from the sensor 19. According to this construction, it is possible to avoid an outbreak of self burning and to attain stable machining.

Embodiment 21

Figure 40:
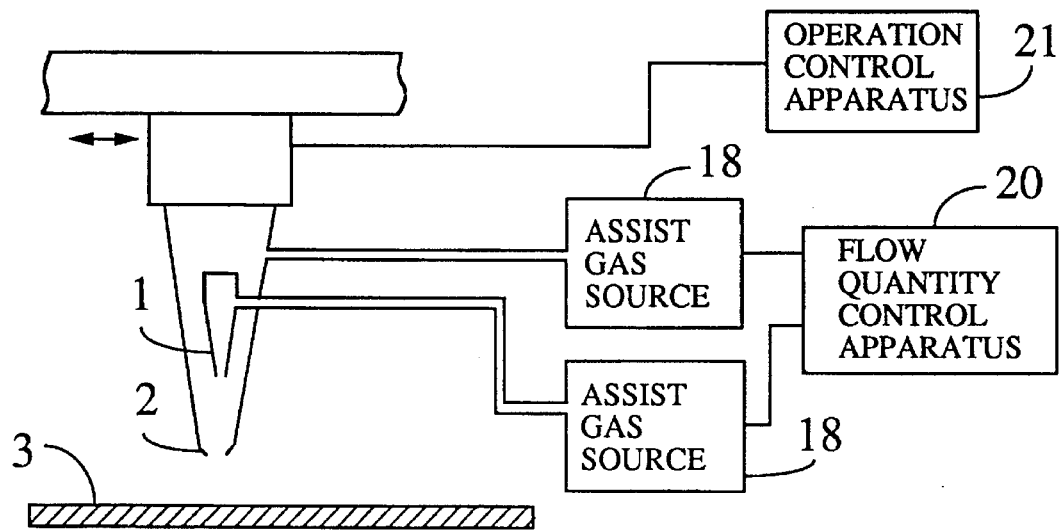
FIG. 40 illustrates a construction of a laser machining apparatus of a twenty first embodiment.

FIG. 40 illustrates a construction a laser machining apparatus according to a twenty first embodiment. The machining apparatus of the twenty first embodiment comprises an operation control apparatus 21 for controlling the laser machining apparatus and a flow control means 20 for controlling the assist gas sources 18. The operation control apparatus 21 adjusts the gas flow quantity and the gas pressure of the main assist gas and the sub assist gas using programming control as a machining initial condition, for example, according to a kind of material, machining velocity, plate thickness.

The operation control apparatus 21 further adjusts the gas flow quantity and the gas pressure of the main assist gas and the sub assist gas using programming control according to a machining process, for example, piercing, straight cutting, angle for corner cutting, curvature for curve cutting, and diameters for circle cutting, semicircle shape cutting and ova shape cutting.

Thereby, it is possible to prevent the operator from adjusting appropriately the flow quantity and also to get a high stability of the machining quality and a reliability.

Embodiment 22

Figure 41:
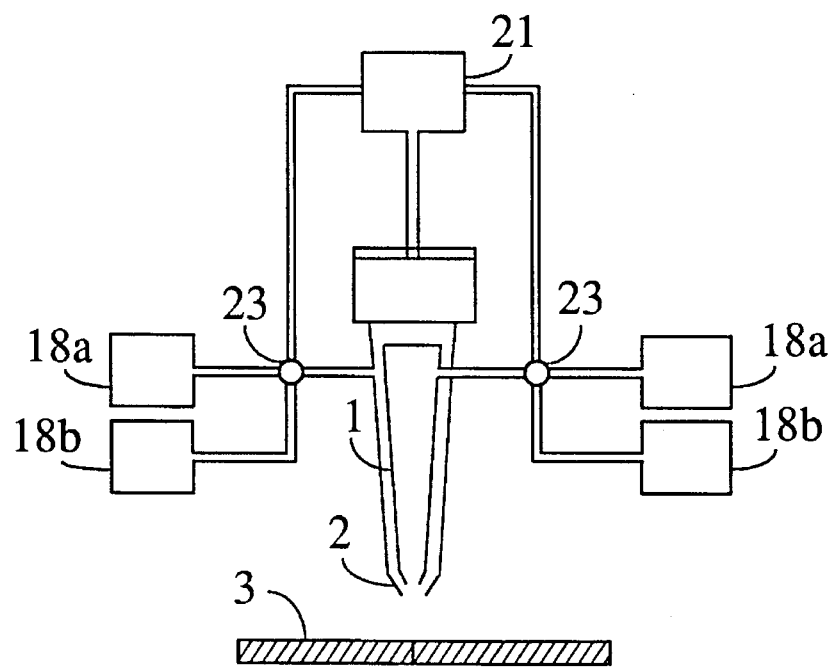
FIG. 41 illustrates a construction of a laser machining apparatus of a twenty second embodiment.

FIG. 41 shows a construction of a twenty second embodiment of the invention. In this embodiment, gas supply resources 18a of certain gas A and gas supply resources 18b of another kind of gas B supply the main assist gas and the sub assist gas. Valves 23 control the change of the gas flow from the supply resources 18a, 18b to the inlets of the machining head. The valves 23 are controlled by the operation control apparatus 21.

By this construction, the kind of main assist gas or sub assist gas is switched from, for example, oxygen gas to nitrogen gas according to, for example, piercing, straight cutting, angle for corner cutting, curvature for curve cutting, and diameters for circle cutting, semicircle shape cutting and oval shape cutting. Thereby, it is possible to avoid the outbreak of the self burning by controlling the burning of the gas. Accordingly, it is possible to machine the work more stably.

In the present embodiment, the kinds of the gases are two, but it is needles to say that more than three gases may be used.

Embodiment 23

Figure 42:
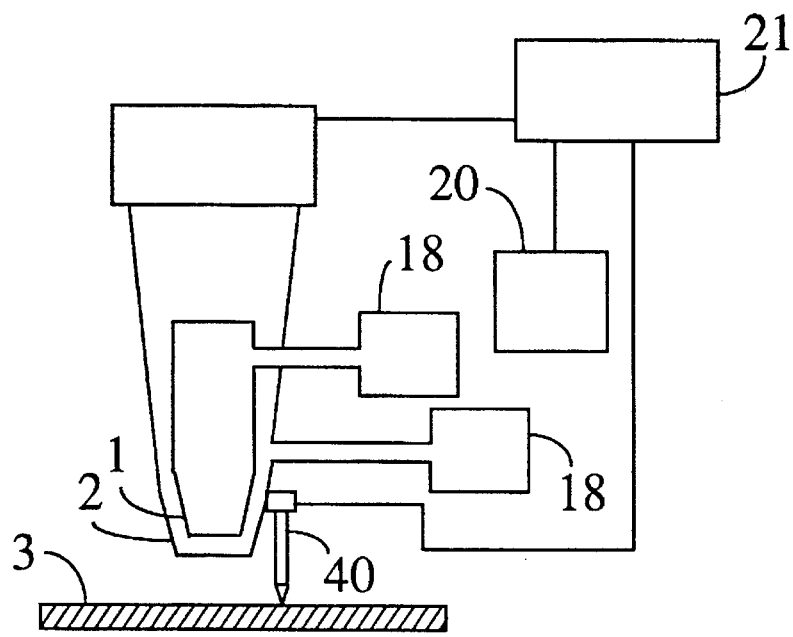
FIG. 42 illustrates a construction of a laser machining apparatus of a twenty third embodiment.

FIG. 42 shows a construction of a twenty third embodiment of the invention. This construction includes a thickness measurement sensor 40 which measures thickness of the work for machining. In this embodiment, the thickness measurement sensor 40 is placed on the machining head. The thickness measurement sensor 40 detects the thickness of the work plate before machining and outputs the result to the operation control apparatus 21. A flow control apparatus 20 controls the main assist gas and the sub assist gas to be an appropriate flow quantity and flow speed according to the thickness of the work plate which is outputted from the operation control apparatus 21.

Thereby, it is possible to prevent the operator from adjusting appropriately the gas pressure and also to get a high efficiency machining apparatus and a high reliability.

The thickness measurement sensor 40 is located on the machining head in this embodiment, but the location of the thickness measurement sensor 40 is not restricted so long as the thickness may be measured.

Embodiment 24

Figure 43:
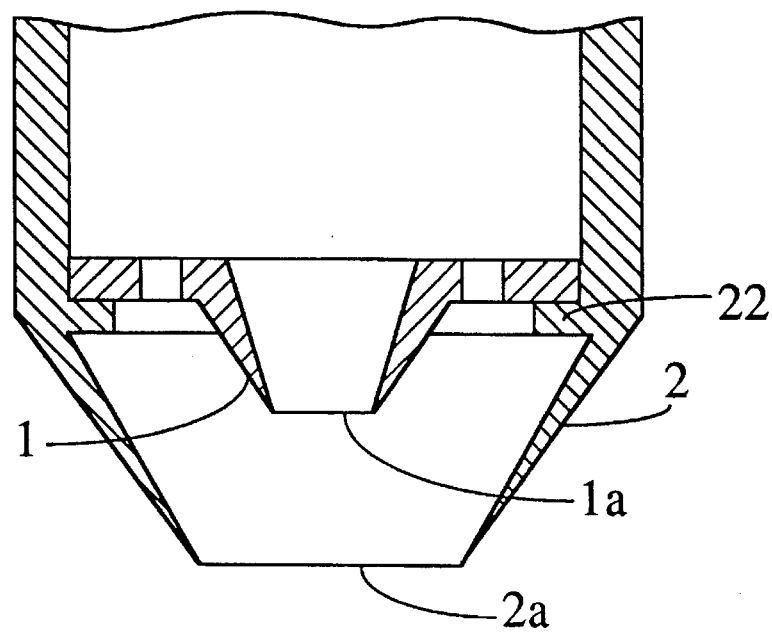
FIG. 43 is a longitudinal cross-sectional view which illustrates a machining head of laser machining apparatus of a twenty fourth embodiment.

FIG. 43 is a longitudinal cross-sectional view which illustrates a machining head of laser machining apparatus according to a twenty fourth embodiment. The machining head of the embodiment comprises a main assist gas nozzle 1 and a sub assist gas nozzle 2 which are separated. The main assist gas nozzle 1 is mounted and fixed on a portion 22 which protrudes from the inside of the sub assist gas nozzle 2 as shown in FIG. 43. According to this construction, since the main assist gas nozzle 1 can be detachably mounted, many combinations of different nozzles having different small hole area and hole numbers for supplying the assist gas can be freely selected depending on the material and thickness of the work.

Therefore, an appropriate flow quantity and appropriate flow ratio of the main assist gas versus the sub assist gas can be selected.

Figures 44A, 44B:
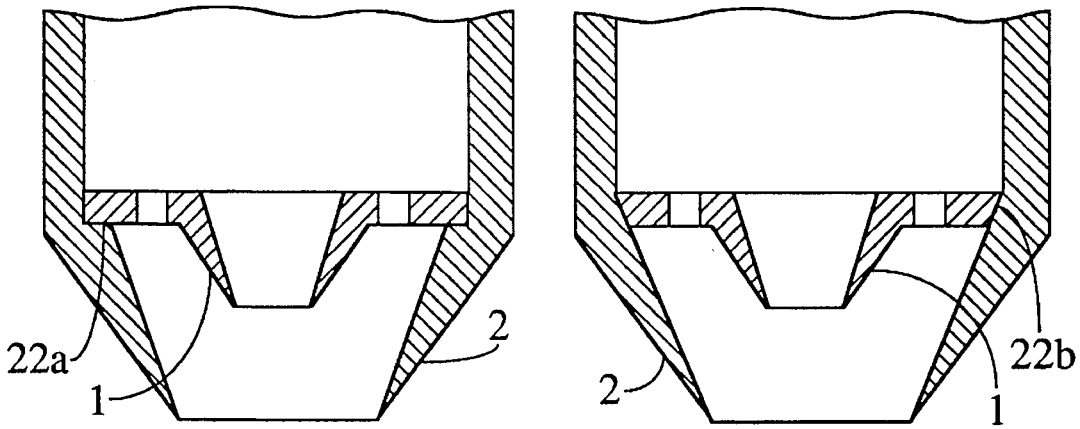
FIGS. 44A and 44B are longitudinal cross-sectional views which illustrate other examples of machining heads of a laser machining apparatus of a twenty fourth embodiment.

Although double annular nozzle construction is explained in the twenty fourth embodiment, a similar effect is obtained in case of multiple annular nozzle construction. In the multiple annular construction, each nozzle is provided separately and fixed inside the wall of nozzle 2. The fixing portion may comprise not only the protruding portion as shown in FIG. 43, but also the construction as shown in FIG. 44A and FIG. 44B. FIG. 44A illustrates a level difference 22a inside of the nozzle 2 and FIG. 44B illustrates a taper portion 22b inside of the nozzle 2.

Embodiment 25

Figure 45:
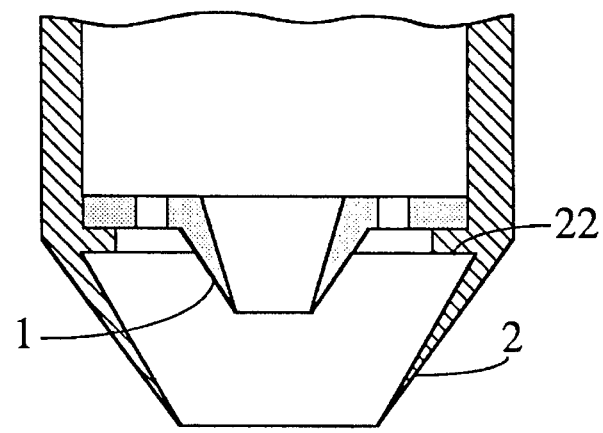
FIG. 45 is a longitudinal cross-sectional view which illustrates a machining head of a laser machining apparatus of a twenty fifth embodiment.
Figure 46:
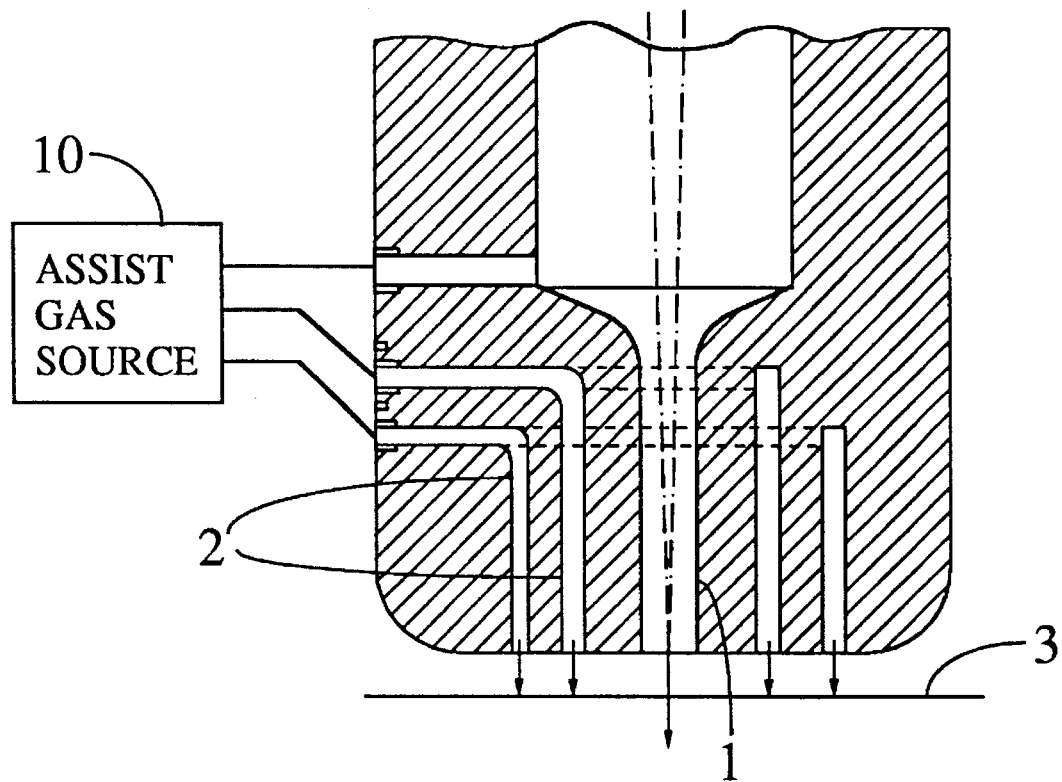
FIG. 46 is a longitudinal cross-sectional view which illustrates a conventional machining head of a laser machining apparatus.

FIG. 45 is a longitudinal cross-sectional view which illustrates a machining head of laser machining apparatus according to a twenty fifth embodiment. In this embodiment, the material of the main assist gas nozzle 1 is different from that of the sub assist gas nozzle 2. The material of the main assist gas nozzle 1 is a metal (brass, for example) which is easy to machine. The material of the sub assist gas nozzle 2 located most outside is a metal which has a high melting point and high hardness. According to this construction, the outermost portion is hardly damaged by spattering due to oxide caused by the high temperature during cutting or splash of melted metal, and protects the inside nozzle 1, thereby the lifetime of the nozzle is extended.

Although the laser cutting apparatus is explained in the above embodiments, it is needless to say that similar effect may be obtained for the laser welding apparatus which comprises the same construction as the laser machining apparatus.

Those skilled in the art will recognize that many modifications to the foregoing description can be made without departing from the spirit of the invention. The foregoing description is intended to be exemplary and in no way limiting. The scope of the invention is defined in the appended claims and equivalents thereto.

For example, the machining head may be comprised of a circulating flow means while the outlet location of the sub assist gas nozzle is the same as that of the main assist gas nozzle, and may be comprised of a circulating flow forming means and a static pressure conversion means, which will have the same effects. Many kinds of machining heads and machining apparatus may be used according to the work (kind of material, plate thickness), machining condition for perforating and cutting, and machining usage.

What is claimed is:

1. A laser machining apparatus including a machining head through which a laser beam passes, comprising:

a main assist gas nozzle at a center portion of the machining head for supplying a main assist gas; and at least one annular sub assist gas nozzle surrounding the main assist gas nozzle, a jet outlet at an innermost diameter of the annular sub assist gas nozzle being no smaller than a jet outlet of the main assist gas nozzle; and means for adjusting flow speed distribution at the sub assist gas nozzle outlet, while maintaining the main assist nozzle fixed relative to said at least one sub assist nozzle, said means for adjusting flow speed distribution including a plurality of partition members forming a plurality of small compartments in said sub assist nozzle, each partition member extending outward from an outer wall of said main assist nozzle in a generally radial direction.

2. A machining apparatus according to claim 1, wherein the means for adjusting flow speed distribution comprises a plurality of gas supply inlets which supply gas to said plurality of small compartments, each of said inlets associated with a corresponding small compartment, or group of small compartments.

3. A machining apparatus according to claim 2, wherein each said small compartment has its own gas supply inlet supplying each said small compartment with its own supply of sub assist gas.

4. A machining apparatus according to claim 1, wherein the means for adjusting flow speed distribution comprises:

a rotatable annular flat board for restricting flow of gas in said sub assist nozzle;

said annular flat board having affixed thereto said plurality of partition members, each of which rotates with said annular flat board;

a driving device for driving said annular flat board;

a control apparatus for operating the driving device.

5. A laser machining apparatus including a machining head according to any one of claims 1, 2, or 4, comprising:

at least one information sensor for detecting temperature of machining surface, width of cutting groove, or amount of spark; and an operation control apparatus for adjusting kinds of gases, flow quantity and pressure of an assist gas which is supplied from the main assist nozzle and/or the at least one sub assist nozzle of said machining head in response to signals from the at least one information sensor.

6. A laser machining apparatus according to claim 5, wherein the operation control apparatus is controlled by a computer program.

7. A laser machining apparatus including a machining head according to any one of claims 1, 2 or 4, further comprising:

means for measuring the thickness of a workpiece;

an operation control apparatus for adjusting flow quantity and pressure of art assist gas which is supplied from the main assist nozzle and/or at least one sub assist nozzle of said machining head in response to an output of the thickness measuring means.

8. A laser machining apparatus according to claim 7, wherein the operation control apparatus is controlled by a computer program.

9. A machining apparatus according to claim 1, wherein a single gas supply inlet supplies a flow of sub assist gas to all of said compartments.

10. A machining apparatus according to claim 1, wherein all partition members share a same height dimension.

11. A machining apparatus according to claim 1, wherein different partition members differ in their respective height dimension.

12. A machining apparatus according to claim 1, wherein said partition members form fan-like leaves extending radially outward from said outer surface of said main assist nozzle.

13. A machining apparatus according to claim 12, wherein spacing between partition members is greater than a thickness dimension of said partition members.

14. A machining head of a laser machining apparatus through which a laser beam passes, comprising:
   a main assist gas nozzle at a center portion of the machining head for supplying a main assist gas; and
   at least one annular sub assist gas nozzle surrounding the main assist gas nozzle, a jet outlet at an innermost diameter of the annular sub assist gas nozzle being no smaller than a jet outlet of the main assist gas nozzle, said sub assist nozzle including a plurality of small rooms formed by a plurality of partition members, each said plurality of partition members extending outward from an outer surface of said main assist nozzle; and
   means for adjusting flow speed distribution at the sub assist gas nozzle outlet.

15. A machining head of a laser machining apparatus through which a laser beam passes, comprising:
   a main assist gas nozzle at a center portion of the machining head for supplying a main assist gas; and
   an annular sub assist gas nozzle surrounding the main assist gas nozzle, a jet outlet at an innermost diameter of the annular sub assist gas nozzle being no smaller than a jet outlet of the main assist gas nozzle, said jet outlet of said main assist nozzle being recessed in said sub assist nozzle; and
   means for adjusting flow speed distribution at the sub assist gas nozzle outlet, said means for adjusting flow speed distribution including a plurality of partition members forming a plurality of small compartments in said sub assist nozzle, each partition member extending outward from an outer wall of said main assist nozzle in a generally radial direction.

* * * * *